US012628145B2

(12) United States Patent
Cui et al.

(10) Patent No.: US 12,628,145 B2
(45) Date of Patent: May 12, 2026

(54) ELECTRONIC DEVICE, WIRELESS COMMUNICATION METHOD, AND COMPUTER READABLE STORAGE MEDIUM

(71) Applicant: Sony Group Corporation, Tokyo (JP)

(72) Inventors: Qimei Cui, Beijing (CN); Jing Liu, Beijing (CN); Tao Cui, Beijing (CN); Xiaofeng Tao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 98 days.

(21) Appl. No.: 18/769,463

(22) Filed: Jul. 11, 2024

(65) Prior Publication Data

US 2024/0365303 A1 Oct. 31, 2024

Related U.S. Application Data

(63) Continuation of application No. 17/436,661, filed as application No. PCT/CN2020/078119 on Mar. 6, 2020, now abandoned.

(30) Foreign Application Priority Data

Mar. 14, 2019 (CN) .......................... 201910193733.4

(51) Int. Cl.
H04W 72/0453 (2023.01)
H04W 74/0808 (2024.01)

(52) U.S. Cl.
CPC ... H04W 72/0453 (2013.01); H04W 74/0808 (2013.01)

(58) Field of Classification Search
CPC ............................ H04W 72/0453; H04L 12/28
(Continued)

(56) References Cited

U.S. PATENT DOCUMENTS

2013/0121267 A1 5/2013 Koorapaty et al.
2018/0255578 A1 9/2018 Kim et al.
(Continued)

FOREIGN PATENT DOCUMENTS

CA 3003951 A1 5/2017
CN 106452705 A 2/2017
(Continued)

OTHER PUBLICATIONS

Huawei et al: "Transmission with configured grant in NR unlicensed band", 3GPP Draft; R1-1901528, 3rd Generation Partnership Project (3GPP), Feb. 25, 2019-Mar. 1, 2019 Feb. 15, 2019 (Feb. 15, 2019), XP051599225, Retrieved from the Internet: URL:http://www. 3gpp.org/ftp/tsg%5Fran/WG1 %5FRL 1/ TSGR1 %5F96/Docs/R1% 2D1901528%2Ezip[retrieved on Feb. 15, 2019].
(Continued)

*Primary Examiner* — Dang T Ton
(74) *Attorney, Agent, or Firm* — XSENSUS LLP

(57) ABSTRACT

An electronic device at a network side serves as a first user equipment and a second user equipment. The electronic device includes a processing circuit and is configured to: determine the second user equipment to share a channel occupy time (COT) of the first user equipment on a time domain, wherein the first user equipment and the second user equipment send uplink information to the electronic device in the COT of the first user equipment using orthogonal frequency domain resources; and generate frequency domain resource indication information of the second user equipment to indicate a frequency domain resource for the second user equipment.

13 Claims, 12 Drawing Sheets

(58) Field of Classification Search
    USPC ................................. 370/329, 400, 401, 403
    See application file for complete search history.

(56)                References Cited

U.S. PATENT DOCUMENTS

| | | | |
|---|---|---|---|
| 2018/0368090 A1 | 12/2018 | Kadambar et al. | |
| 2019/0363843 A1* | 11/2019 | Gordaychik | H04W 28/16 |
| 2020/0229222 A1* | 7/2020 | Jiang | H04W 74/04 |
| 2021/0410164 A1 | 12/2021 | Zhou | |
| 2023/0058280 A1 | 2/2023 | Jiang et al. | |
| 2023/0344569 A1* | 10/2023 | Ji | H04L 5/0023 |

FOREIGN PATENT DOCUMENTS

| | | | |
|---|---|---|---|
| CN | 107889114 | A | 4/2018 |
| CN | 108882376 | A | 11/2018 |
| CN | 109417739 | A | 3/2019 |
| CN | 109417801 | A | 3/2019 |
| CN | 109428695 | A | 3/2019 |
| CN | 110475343 | A | 11/2019 |
| CN | 110784874 | A | 2/2020 |
| WO | 2019015590 | A1 | 1/2019 |

OTHER PUBLICATIONS

Zte et al: "Discussion on configured grant for NR-U", 3GPP Draft; R1-1901612 Discussion on Configured Grant for NR-U, 3rd Generation Partnership Project (3GPP), Feb. 25, 2019-Mar. 1, 2019 (Feb. 16, 2019), XP051599309, Retrieved from the Internet: URL:http://www.3gpp.org/ftp/tsg%5Fran/WG1%5FRL1/TSGR1%5F96/Docs/R1%2D1901612%2Ezip [retrieved on Feb. 16, 2019] * section 2.3.3.

International Search Report and Written Opinion mailed on May 25, 2020, received for PCT Application PCT/CN2020/078119, Filed on Mar. 6, 2020, 12 pages including English Translation.

Interdigital Inc. "On HARQ Enhancements for NR-U", 3GPP TSG RAN WG1 Meeting #94, R1-1809091, Aug. 20-24, 2018, pp. 1-6.

Interdigital Inc. "Channel Access Procedure and Coexistence in NR-U", 3GPP TSG RAN WG1 Meeting #94bis, R1-1811204, Oct. 8-12, 2018, 6 pages.

* cited by examiner

ELECTRONIC DEVICE, WIRELESS COMMUNICATION METHOD, AND COMPUTER READABLE STORAGE MEDIUM

CROSS-REFERENCE TO RELATED APPLICATIONS

This application is a continuation of U.S. application Ser. No. 17/436,661, filed Sep. 7, 2021, which is based on PCT filing PCT/CN2020/078119, filed Mar. 6, 2020, which claims the priority to Chinese Patent Application No. 201910193733.4 titled "ELECTRONIC DEVICE, WIRELESS COMMUNICATION METHOD, AND COMPUTER READABLE STORAGE MEDIUM", filed on Mar. 14, 2019, with the China National Intellectual Property Administration (CNIPA), each of which is incorporated herein by reference in its entirety.

FIELD

Embodiments of the present disclosure generally relate to the field of wireless communications, and in particular to an electronic device, a wireless communication method, and a computer readable storage medium. Specially, the present disclosure relates to an electronic device for a network side, an electronic device for a user side, a wireless communication method performed by an electronic device for a network side, a wireless communication method performed by an electronic device for a user side, and a computer readable storage medium.

BACKGROUND

In a process of using an unlicensed frequency band for communication, when a device that is to perform communication accesses to a channel, channel occupancy time for data transmission should be less than Max Channel Occupancy Time (MCOT). In a cellular cell, for example, a network side device of a base station may serve multiple user equipments. In a case of transmitting uplink information, each user equipment is required to perform a channel detection process, to transmit information to the network side device on an idle channel. In this case, time for the user equipment to access to the unlicensed frequency band is greatly increased.

In addition, the network side device configures multiple bandwidth parts (BWPs) for each user equipment in frequency domain, and activates one or more of the multiple configured BWPs, so that the user equipment transmits uplink information by selecting one or more of the BWPs that are in an activated state. That is, the user may selects only one of multiple BWPs configured for the user equipment. In this case, frequency domain resources are not fully utilized, resulting in low resource utilization of the system.

It is assumed that the user equipment transmits uplink information to the network side device using one BWP that are in the activated state. For some services sensitive to delay, if the user equipment receives no feedback information from the network side device, the user equipment is required to be switched to another BWP that is in the activated state to retransmit the uplink information to the network side device. In this case, the network side device is required to schedule, and the switching process is complex and time-consuming, resulting in not meeting low delay requirements of the services.

Therefore, it is required to propose a technical solution to solve at least one of the above technical problems.

SUMMARY

This section provides a general summary of the present disclosure, rather than a comprehensive disclosure of full scope or all features of the present disclosure.

An electronic device, a wireless communication method, and a computer readable storage medium are provided according to the present disclosure, to provide an enhanced mechanism for using a BWP, so as to improve resource utilization of the system, reduce time for a user equipment to access to an unlicensed frequency band, and reduce delay of information.

An electronic device for a network side is provided according to one aspect of the present disclosure. The electronic device serves a first user equipment and a second user equipment. The electronic device includes processing circuitry. The processing circuitry is configured to: determine that the second user equipment shares a Channel Occupy Time (COT) of the first user equipment in time domain, where the first user equipment and the second user equipment transmit uplink information to the electronic device within the COT of the first user equipment using orthogonal frequency domain resources; and generate frequency domain resource indication information of the second user equipment, to indicate frequency domain resources used for the second user equipment.

An electronic device for a user side is provided according to another aspect of the present disclosure. The electronic device includes processing circuitry. The processing circuitry is configured to: determine that other user equipment shares a Channel Occupy Time (COT) of the electronic device in time domain, where the other user equipment and the electronic device transmit uplink information to a network side device within the COT of the electronic device using orthogonal frequency domain resources; and generate time domain resource indication information of the other user equipment, to indicate time domain resources used for the other user equipment.

A wireless communication method performed by an electronic device for a network side is provided according to another aspect of the present disclosure. The electronic device serves a first user equipment and a second user equipment. The wireless communication method includes: determining that the second user equipment shares a Channel Occupy Time (COT) of the first user equipment in time domain, where the first user equipment and the second user equipment transmit uplink information to the electronic device within the COT of the first user equipment using orthogonal frequency domain resources; and generating frequency domain resource indication information of the second user equipment, to indicate frequency domain resources used for the second user equipment.

A wireless communication method performed by an electronic device for a user side is provided according to another aspect of the present disclosure. The wireless communication method includes: determining that other user equipment shares a Channel Occupy Time (COT) of the electronic device in time domain, where the other user equipment and the electronic device transmit uplink information to a network side device within the COT of the electronic device using orthogonal frequency domain resources; and generating time domain resource indication information of the other user equipment, to indicate time domain resources used for the other user equipment.

A computer readable storage medium is provided according to another aspect of the present disclosure. The computer readable storage medium includes an executable computer instruction that, when executed by a computer, causes the computer to perform the wireless communication method according to the present disclosure.

With the electronic device, the wireless communication method and the computer readable storage medium according to the present disclosure, multiple user equipments can share a COT of one of the multiple user equipments. That is, the multiple user equipments transmits uplink information within a COT of one of the multiple user equipments using orthogonal frequency domain resources. In this way, other user equipment can access to the unlicensed frequency band without performing the channel detection process, thereby greatly reducing time for the other user equipment to access to the unlicensed frequency band. Furthermore, with the electronic device, the wireless communication method and the computer readable storage medium according to the present disclosure, unused BWPs of one user equipment can be used by other user equipment, thereby greatly improving the resource utilization of the system. In addition, the network side device can transmit feedback information to the user equipment using multiple BWPs, thereby improving probability that the feedback information is successfully received. Furthermore, in the case that no feedback information is received, the user equipment can be automatically switched to other BWP that is in the activated state without assistance of the network side device, so that the switching process of the BWPs is simplified, thereby meeting the delay requirements of some services sensitive to delay. In summary, an enhanced mechanism for using a BWP is provided according to the present disclosure, thereby improving the resource utilization of the system, reducing the time for the user equipment to access to the unlicensed frequency band, and reducing the delay of information.

Further applicability areas are become apparent from the description provided herein. The description and specific examples in the summary are only schematic and are not intended to limit the scope of the present disclosure.

BRIEF DESCRIPTION OF THE DRAWINGS

Drawings described herein are only schematic for described embodiments, rather than all embodiments, and are not intended to limit the scope of the present disclosure. In the drawing.

Figure 1:
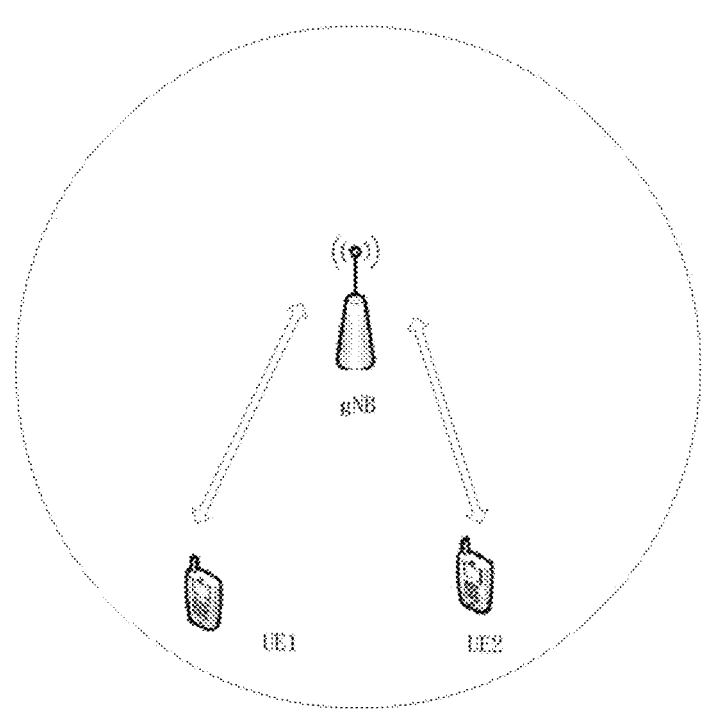
FIG. 1 is a schematic diagram showing an application scenario according to an embodiment of the present disclosure.

While the present disclosure is susceptible to various modifications and alternative forms, specific embodiments thereof have been shown by way of example in the drawings and are herein described in detail. It should be understood that the description for the specific embodiments herein is not intended to limit the present disclosure to the disclosed specific forms, but on the contrary, the present disclosure is intended to encompass all modifications, equivalents and alternatives that fall within the spirit and scope of the present disclosure. It should be noted that, reference numerals indicate parts corresponding to the reference numerals throughout the drawings.

DETAILED DESCRIPTION OF EMBODIMENTS

Examples of the present disclosure are described more fully with reference to the drawings. The following description is merely exemplary rather than being intended to limit the present disclosure and applications or uses of the present disclosure.

Exemplary embodiments are provided to make the present disclosure be exhaustive and fully convey the scope of the present disclosure to those skilled in the art. Various specific details such as specific parts, devices and methods are set forth to provide thorough understanding for the embodiments of the present disclosure. It is apparent to those skilled in the art that the exemplary embodiments may be embodied in many different forms without the specific details, and the specific details are not interpreted as a limit for the scope of the present disclosure. In some exemplary embodiments, well-known processes, well-known structures and well-known technology are not described in detail.

Hereinafter, the present disclosure is described according to the following sequence.

1. Description of Scenarios.

2. Configuration Examples of Electronic Device for Network Side.

3. Configuration Examples of Electronic Device for User Side.

4. Method Embodiments.

5. Application Examples.

1. Description of Scenarios

FIG. 1 is a schematic diagram showing an application scenario according to an embodiment of the present disclosure. As shown in FIG. 1, a wireless communication system includes a gNB (that is, a base station apparatus in a 5G communication system) and two User Equipments (UEs), that is, UE1 and UE2. The gNB provides services for the UE1 and the UE2, that is, the UE1 and the UE2 are within coverage of the gNB. The UE1 and the UE2 may transmit uplink information to the gNB using a cellular link. The gNB may transmit downlink information to the UE1 and the UE2 using the cellular link. Both the uplink information and the downlink information may include data information and control information. FIG. 1 only shows a case that one gNB serves two UEs. The numbers of the gNB and the UE are not limited in the present disclosure. In addition, although not shown in FIG. 1, the UE1 and the UE2 may communicate with each other via a sidelink (SL).

For such scenario, an electronic device in a wireless communication system, a wireless communication method performed by an electronic device in a wireless communication system, and a computer readable storage medium are provided according to the present disclosure, to improve resource utilization of the system, reduce time for user equipment to access to an unlicensed frequency band, and reduce delay of information.

It should be noted that the present disclosure relates to communication on the unlicensed frequency band. That is, before transmitting uplink information to, for example, a network side device of the gNB, the UE1 is required to perform a channel detection process to detect whether the channel is idle, to transmit uplink information on a channel that is detected to be idle. Certainly, after the UE1 is accessed to the channel, channel occupancy time for data transmission should be less than MCOT. The channel detection process herein may be, for example, a listen before talk (LBT) process. Furthermore, the LBT process may include a LBT process without random backoff, a LBT process with random backoff and a variable-sized contention window, and a LBT process with random backoff and a fixed-sized contention window. The specific mode of the channel detection process is not limited in the present disclosure.

In addition, according to an embodiment of the present disclosure, the network side device may configure BWPs for the user equipment and set an activation state of each of the configured BWPs. Next, the user equipment may transmit uplink information by selecting one or more of the BWPs that are in an activated state. In other words, the user equipment may perform the channel detection process on the multiple BWPs that are in the activated state, so as to transmit uplink information by selecting a BWP that is detected to be idle in the channel detection process. Generally, configuration and use of the BWP have the following options:

option 1a: configuring multiple BWPs, activating multiple BWPs, and transmitting uplink information on one or more of the BWPs;

option 1b: configuring multiple BWPs, activating multiple BWPs, and transmitting uplink information on one of the BWP;

option 2: configuring multiple BWPs, activating one of the multiple BWPs, and transmitting uplink information on the BWP; and option 3: configuring multiple BWPs, activating one of the multiple BWPs, and transmitting uplink information on all or part of the BWP.

The embodiments of the present disclosure support any one of the above four options.

The network side device according to the present disclosure may be implemented as any type of transmit and receive port (TRP). The TRP may have a function of transmitting and receiving. For example, the TRP may receive information from a user equipment and a base station apparatus, and may further transmit information to the user equipment and the base station apparatus. In an embodiment, the TRP may provide services to the user equipment, and may also be controlled by the base station apparatus. In other words, the base station apparatus provides services to the user equipment via the TRP. In addition, the network side device described in the present disclosure may also be the base station apparatus, for example, the eNB or the gNB (a base station in a 5th generation communication system).

The user equipment according to the present disclosure may be implemented as mobile terminals (such as a smart phone, a tablet personal computer (PC), a notebook PC, a portable game terminal, a portable/dongle mobile router and a digital camera) or a vehicle terminal (such as a car navigation apparatus). The user equipment may be implemented as a terminal (also known as machine type communication (MTC) terminal) that performs machine to machine (M2M) communication. In addition, the user equipment may be a wireless communication module (such as an integrated circuit module including one chip) installed on each of the above terminals.

2. Configuration Examples of Electronic Device for Network Side

Figure 2:
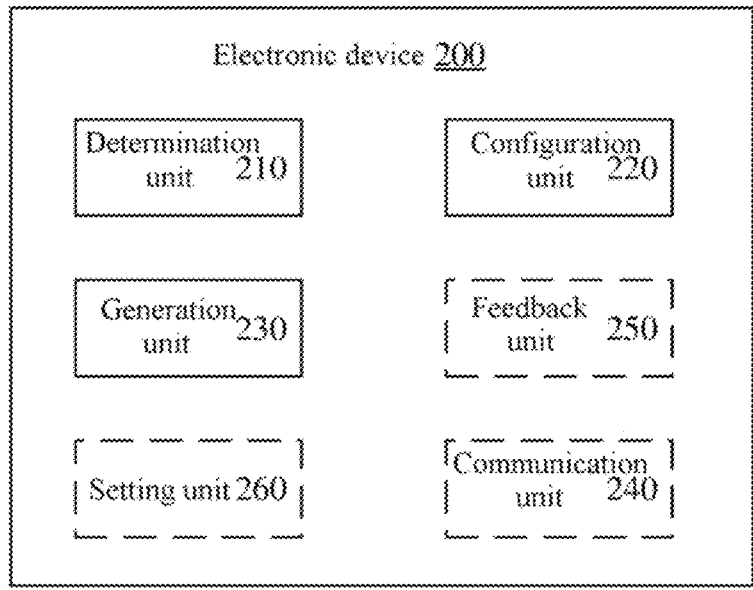
FIG. 2 is a block diagram showing a configuration example of an electronic device for a network side according to an embodiment of the present disclosure.

FIG. 2 is a block diagram showing a configuration example of an electronic device 200 according to an embodiment of the present disclosure. The electronic device 200 may serve as a network side device in a wireless communication system, specifically, serving as a base station apparatus or a TRP in the wireless communication system. According to the embodiment of the present disclosure, the electronic device 200 serves at least a first user equipment and a second user equipment. Here, both the first user equipment and the second user equipment may be user equipments within service scope of the electronic device 200. "The first" and "the second" are not intended to distinguish, so the first user equipment and the second user equipment may have a same structure and function.

As shown in FIG. 2, the electronic device 200 may include a determination unit 210, a configuration unit 220 and a generation unit 230.

Here, each unit of the electronic device 200 may be included in processing circuitry. It should be noted that, the electronic device 200 may include one processing circuitry or multiple processing circuitries. Furthermore, the processing circuitry may include various discrete functional units to perform various different functions and/or operations. It should be noted that these functional units may be physical entities or logical entities, and units with different names may be implemented by a same physical entity.

According to an embodiment of the present disclosure, the determination unit 210 is configured to determine that the second user equipment shares a COT of the first user equipment in time domain. That is, the first user equipment acquires a right to use a specific unlicensed frequency band by, for example, performing a channel detection process. Channel occupation time (COT) of the first user equipment for the specific unlicensed frequency band cannot exceed max channel occupation time (MCOT). Here, the second user equipment sharing the COT of the first user equipment refers to that the first user equipment and the second user equipment transmit uplink information to the electronic device 200 within the COT of the first user equipment using orthogonal frequency domain resources.

According to an embodiment of the present disclosure, the configuration unit 220 may configure frequency domain resources for the second user equipment to transmit uplink information.

According to an embodiment of the present disclosure, the generation unit 230 may generate frequency domain resource indication information of the second user equipment, to indicate the frequency domain resources used for the second user equipment.

It can be seen that according to the embodiment of the present disclosure, the second user equipment may share the COT of the first user equipment. That is, the first user equipment and the second user equipment may transmit uplink information within the COT of the first user equipment using orthogonal frequency domain resources. In this way, the second user equipment may access to the unlicensed frequency band without performing the channel detection process, thereby greatly reducing the time for the second user equipment to access to the unlicensed frequency band. In addition, here, the second user equipment may be any user equipment within the coverage of the electronic device 200, that is, the second user equipment sharing the COT of the first user equipment may be one user equipment or multiple user equipments. That is, according to the embodiment of the present disclosure, multiple user equipments may share a COT of one of the user equipments, so that the multiple user equipments may transmit uplink information within the COT of one of the user equipments using mutually orthogonal frequency domain resources. In this way, multiple second user equipments can access to the unlicensed frequency band without performing the channel detection process, thereby greatly reducing the time for the second user equipment to access to the unlicensed frequency band.

According to an embodiment of the present disclosure, as shown in FIG. 2, the electronic device 200 may further include a communication unit 240. The communication unit 240 is configured to transmit information to devices other than the electronic device 200 and/or receive information from devices other than the electronic device 200. Here, the electronic device 200 may transmit frequency domain resource indication information of the second user equipment to the second user equipment via the communication unit 240.

According to an embodiment of the present disclosure, the first user equipment and the second user equipment may transmit uplink information to the electronic device 200 using orthogonal frequency domain resources within a same BWP.

According to an embodiment of the present disclosure, the first user equipment may determine that a BWP of an unlicensed frequency band is idle by, for example, performing the channel detection process, to transmit uplink information using the BWP. Here, the BWP may be a BWP of the first user equipment that is in the activated state and a BWP of the second user equipment that is in the activated state. As described above, multiple BWPs may be configured for one user equipment. One or more of the multiple BWPs may be in the activated state. The user equipment may transmit uplink information using the BWP that is in the activated state. According to an embodiment of the present disclosure, in a case that the first user equipment and the second user equipment have at least one same BWP that is in the activated state, the first user equipment and the second user equipment may transmit uplink information to the electronic device 200 using orthogonal frequency domain resources within the BWP.

According to an embodiment of the present disclosure, the determination unit 210 may determine a user equipment capable of sharing a COT with the first user equipment. That is, after determining a BWP to be used by the first user equipment, the determination unit 210 may determine other user equipment of which the BWP is in the activated state, to determine such user equipment as the user equipment capable of sharing the COT with the first user equipment. For example, assuming that the BWP to be used by the first user equipment is BWP1, the BWP1, BWP2, BWP3 and BWP4 are configured for a user equipment A within the service scope of the electronic device 200, and BWPs that are in the activated state are the BWP1 and the BWP2, the determination unit 210 may determine that the user equipment A as the second user equipment capable of sharing the COT with the first user equipment, because the BWP1 is a BWP of the user equipment A that is in the activated state. For another example, assuming that the BWP to be used by the first user equipment is the BWP1, the BWP1, the BWP2, the BWP3 and the BWP4 are provided for a user equipment B within the service scope of the electronic device 200, and BWPs that are in the activated state are the BWP3 and the BWP4, the determination unit 210 may determine that the user equipment B cannot share the COT with the first user equipment, because the BWP1 of the user equipment B is not in the activated state.

According to an embodiment of the present disclosure, the configuration unit 220 may divide the BWP into multiple sub-bands in frequency domain, and spans of the sub-bands in frequency domain may be even or uneven. In a non-limiting embodiment, the BWP may be evenly divided into 10 sub-bands in frequency domain, and each of the sub-bands in frequency domain occupies a width of 10 physical resource blocks (PRB) in frequency domain. Furthermore, the multiple sub-bands may be grouped into multiple groups, and each group includes multiple sub-bands arranged continuously. Furthermore, the first user equipment may use a first sub-band in each group, and the second user equipment may use a second sub-band in each group. In this way, the first user equipment and the second user equipment may successively use multiple sub-bands within the BWP in an "interleaved" manner. In addition, according to an embodiment of the present disclosure, in a case that a third user equipment also shares the COT of the first user equipment, the third user equipment may use a third sub-band in each group. That is, all the user equipments sharing the COT of the first user equipment may successively use multiple sub-bands within the BWP in the "interleaved" way, that is, all the user equipments sharing the COT of the first user equipment use mutually orthogonal frequency domain resources.

Figure 3:
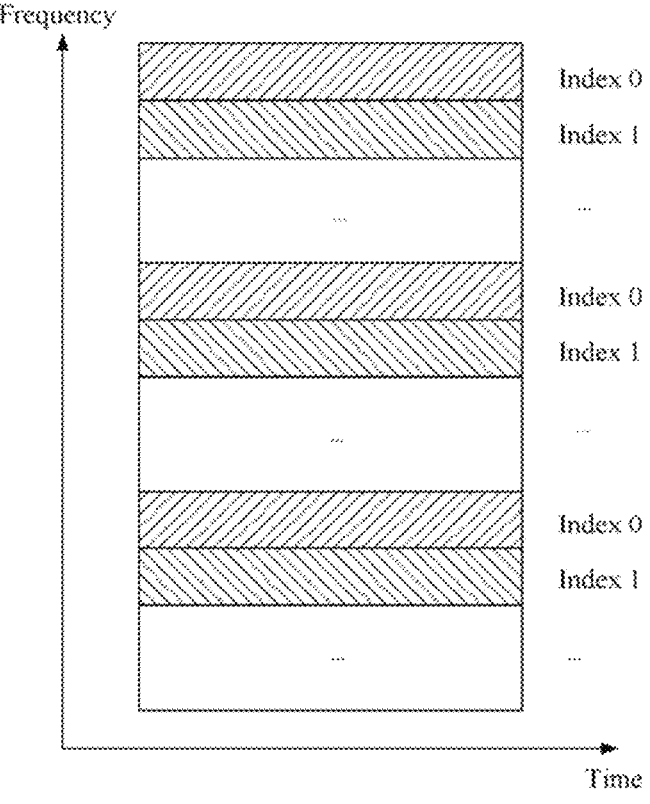
FIG. 3 is a schematic diagram showing a case that multiple user equipments use orthogonal frequency domain resources within a same BWP according to an embodiment of the present disclosure.

FIG. 3 is a schematic diagram showing a case that multiple user equipments use orthogonal frequency domain resources within a same BWP according to an embodiment of the present disclosure. As shown in FIG. 3, a horizontal axis represents time, a vertical axis represents frequency domain, a width of a rectangle in FIG. 3 on the horizontal axis represents a length of the MCOT of the first user equipment, and a length of the rectangle on the vertical axis represents a span of one BWP in frequency domain. It is assumed that a BWP shown in FIG. 3 is a BWP of the first user equipment that is in the activated state and is a BWP of the second user equipment that is in the activated state. As shown in FIG. 3, the BWP is divided into multiple sub-bands in frequency domain. A sub-band indicated by an oblique line inclining to left is represented by an index 0, and a sub-band indicated by an oblique line inclining to right is represented by an index 1. In addition, FIG. 3 shows a case that multiple sub-bands are grouped into three groups. The first sub-band in each group is represented by the index 0, and the second sub-band in each group is represented by the index 1. Certainly, although not shown, the BWP may further include sub-bands represented by indexes 2, 3 and the like.

According to an embodiment of the present disclosure, the configuration unit 220 may configure frequency domain resources for the second user equipment to transmit uplink information. For example, the configuration unit 220 may configure resources for the second user equipment, and the resources are within a BWP used by the first user equipment and are orthogonal to resources used by the first user equipment in frequency domain. For example, as shown in FIG. 3, assuming that the first user equipment uses the sub-band represented by the index 0, the configuration unit 220 may configure the sub-band represented by the index 1 for the second user equipment.

According to an embodiment of the present disclosure, the configuration unit 220 may further configure frequency domain resources for the first user equipment to transmit uplink information. Furthermore, the generation unit 230 may further generate frequency domain resource indication information of the first user equipment, to indicate the frequency domain resources used for the first user equipment. Furthermore, the electronic device 200 may transmit the frequency domain resource indication information of the first user equipment to the first user equipment via the communication unit 240.

Here, the frequency domain resource indication information generated by the generation unit 230 may indicate indexes of the frequency domain resources, for example, the index 0 or the index 1 in FIG. 3. The indexes of the frequency domain resources have a mapping relationship with frequency domain resources within the BWP, that is, location of the frequency domain resources within the BWP may be determined in frequency domain according to the indexes of the frequency domain resources. That is, the frequency domain resource indication information of the second user equipment indicates an index used for frequency domain resources of the second user equipment, and the frequency domain resource indication information of the first user equipment indicates an index used for frequency domain resources of the first user equipment.

According to an embodiment of the present disclosure, after the determination unit 210 determines the second user equipment sharing the COT of the first user equipment, the configuration unit 220 may configure frequency domain resources for the first user equipment and the second user equipment to transmit uplink information. Specially, the configuration unit 220 may configure orthogonal frequency domain resources within a same BWP for the first user equipment and the second user equipment, for example, frequency domain resources represented by different indexes within a same BWP. Furthermore, assuming that the number of the second user equipment sharing the COT of the first user equipment is more than one, the configuration unit 220 may configure mutually orthogonal frequency domain resources for the first user equipment and the multiple second user equipments, that is, the index of the frequency domain resource configured for the first user equipment is different from the indexes of the frequency domain resources configured for the multiple second user equipment.

According to an embodiment of the present disclosure, after the determination unit 210 determines the second user equipment sharing the COT of the first user equipment, the configuration unit 220 may first configure the frequency domain resource for the first user equipment to transmit uplink information. Specifically, the configuration unit 220 may configure frequency domain resources for the first user equipment within a BWP that the first user equipment expects to use, for example, frequency domain resources represented by an index within the BWP. Furthermore, the electronic device 200 may receive uplink information from the first user equipment via the communication unit 240, and may determine the frequency domain resources for the first user equipment to transmit uplink information. Furthermore, the configuration unit 220 may determine frequency domain resources used for the second user equipment according to frequency domain resources actually used when the first user equipment transmits the uplink information. That is, the configuration unit 220 may determine that the frequency domain resources used for the second user equipment are orthogonal to the frequency domain resources actually used when the first user equipment transmits the uplink information. Similarly, assuming that the number of the second user equipment sharing the COT of the first user equipment is more than one, the configuration unit 220 may configure the frequency domain resources for the multiple second user equipments, so that the frequency domain resources of each second user equipment are orthogonal to the frequency domain resources actually used when the first user equipment transmits the uplink information, and the frequency domain resources of the second user equipments are orthogonal to each other.

As described above, according to an embodiment of the present disclosure, after the configuration unit 220 configures the frequency domain resources for the first user equipment, the first user equipment may transmit uplink information using the frequency domain resources configured by the configuration unit 220, or may transmit uplink information not using the frequency domain resources configured by the configuration unit 220. Therefore, the configuration unit 220 may determine the frequency domain resources of the second user equipment according to the frequency domain resources actually used when the first user equipment completes transmitting of the uplink information, so as to fully ensure that the frequency domain resources of the first user equipment are orthogonal to the frequency domain resources of the second user equipment.

According to an embodiment of the present disclosure, after acquiring the frequency domain resource indication information from the electronic device 200, the second user equipment may determine the frequency domain resources used when the second user equipment transmits uplink information according to the frequency domain resource indication information. Furthermore, the second user equipment is required to acquire time domain resources for transmitting uplink information before transmitting the uplink information. Here, since the second user equipment shares the COT of the first user equipment, the time domain resources used when the second user equipment transmits the uplink information are actually time domain resources within the COT of the first user equipment.

According to an embodiment of the present disclosure, the second user equipment may acquire time domain resource indication information from the first user equipment to indicate time domain resources used for the second user equipment. Here, the first user equipment may use the time domain resources within the COT of the first user equipment as the time domain resources used for the second user equipment. According to an embodiment of the present disclosure, the first user equipment may broadcast such time domain resource indication information.

Furthermore, according to an embodiment of the present disclosure, the configuration unit 220 may configure the time domain resources for the second user equipment to transmit uplink information. The generation unit 230 may generate the time domain resource indication information of the second user equipment, to indicate the time domain resources used for the second user equipment. Furthermore, the electronic device 200 may transmit the time domain resource indication information to the second user equipment via the communication unit 240. Here, the electronic device 200 may receive, from the first user equipment, the time domain resources within the COT of the first user equipment via the communication unit 240, so that the configuration unit 220 may use the time domain resources within the COT of the first user equipment as the time domain resources used for the second user equipment. That is, the second user equipment may acquire the time domain resource indication information from the electronic device 200, to indicate the time domain resources used for the second user equipment.

Furthermore, according to an embodiment of the present disclosure, the electronic device 200 may receive the time domain resources within the COT of the first user equipment when receiving the uplink information from the first user equipment, that is, the first user equipment may simultaneously transmit the uplink information and the time domain resources within the COT. In an embodiment, the first user equipment may further respectively transmit the uplink information and the time domain resources within the COT. In addition, in a case that the second user equipment receives the time domain resource indication information from the electronic device 200, the electronic device 200 may simultaneously transmit the time domain resource indication information and the frequency domain resource indication information, or may respectively transmit the time domain resource indication information and the frequency domain resource indication information.

According to an embodiment of the present disclosure, the time domain resources within the COT of the first user equipment may include, for example, starting time and ending time of the COT of the first user equipment. In other words, after acquiring the time domain resources within the COT of the first user equipment, the second user equipment may determine location of transmitting the uplink information to the electronic device 200 in time domain. After acquiring the frequency domain resource indication information, the second user equipment may determine location of transmitting the uplink information to the electronic device 200 in frequency domain. Therefore, the second user equipment may transmit uplink information to the electronic device 200 within the COT of the first user equipment using frequency domain resources orthogonal to the frequency domain resources of the first user equipment.

Figure 4:
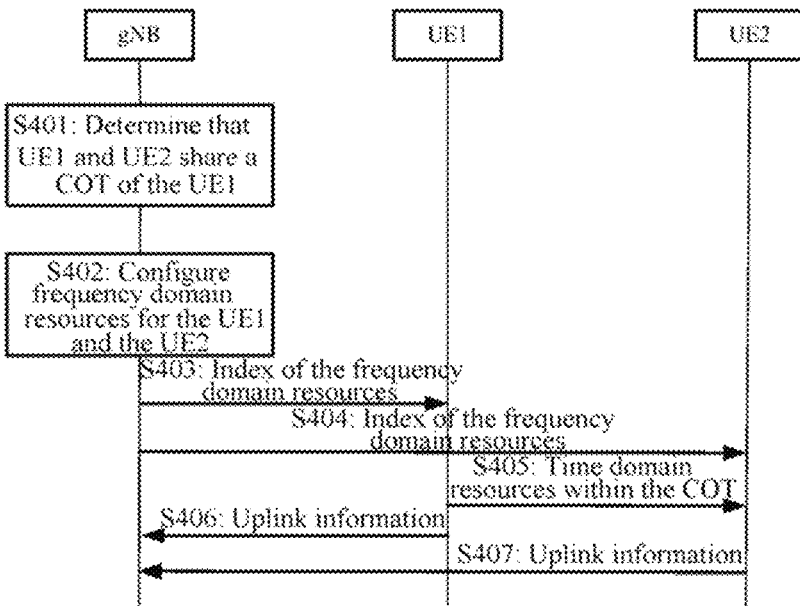
FIG. 4 is a signaling flow chart showing a process that multiple user equipments share a COT of one user equipment according to an embodiment of the present disclosure.
Figure 5:
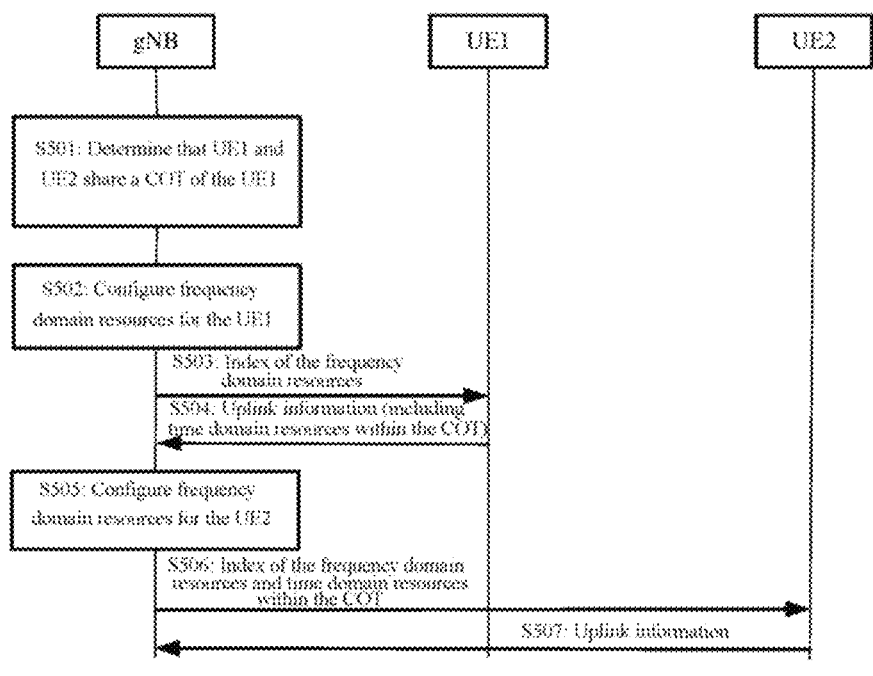
FIG. 5 is a signaling flow chart showing a process that multiple user equipments share a COT of one user equipment according to another embodiment of the present disclosure.

FIGS. 4 and 5 are signaling flow charts showing processes that multiple user equipments share a COT of one user equipment according to embodiments of the present disclosure. In FIGS. 4 and 5, UE1 represents the first user equipment, UE2 represents the second user equipment, and a gNB represents the electronic device 200. That is, the gNB provides services for the UE1 and the UE2, the UE1 acquires a right to use the unlicensed frequency band (such as a specific BWP) by performing a channel detection process.

In FIG. 4, in step S401, the gNB determines that the UE1 and the UE2 may share a COT of the UE1. Next, in step S402, the gNB configures orthogonal frequency domain resources within a BWP for the UE1 and the UE2. For example, the gNB configures frequency domain resources represented by the index 0 in FIG. 3 for the UE1 and frequency domain resources represented by the index 1 in FIG. 3 for the UE2. Next, in step S403, the gNB transmits to the UE1, frequency domain resource indication information, for example, the index 0. Next, in step S404, the gNB transmits to the UE2, frequency domain resource indication information, for example, the index 1. Next, in step S405, the UE1 transmits time domain resources within the COT of the UE1 to the UE2, for example, by broadcasting. Next, in step S406, the UE1 transmits uplink information to the gNB within the COT of the UE1 using the frequency domain resources within the BWP configured by the gNB. Next, in step S407, the UE2 transmits uplink information to the gNB within the COT of UE1 using the frequency domain resources within the same BWP configured by the gNB. Therefore, the UE1 and the UE2 share the COT of the UE1 and transmit the uplink information to the gNB using the orthogonal frequency domain resources within the same BWP. It should be noted that in FIG. 4, an order of step S403 and step S404 may be interchanged, and an order of step S406 and step s407 may be interchanged. In addition, step S406 may be performed before step S404, and step S405 may be performed before step S404.

In FIG. 5, in step S501, the gNB determines that the UE1 and the UE2 may share the COT of the UE1. Next, in step S502, the gNB configures the frequency domain resources for the UE1. For example, the gNB configures frequency domain resources represented by the index 0 in FIG. 3 for the UE1. Next, in step S503, the gNB transmits to the UE1, the frequency domain resource indication information, for example, the index 0. Next, in step S504, the UE1 transmits uplink information, to the gNB within the COT of the UE1, using the frequency domain resources within the BWP configured by the gNB. In addition, the UE1 may further transmit the time domain resources to the gNB within the COT of the UE1. Next, in step S505, the gNB configures frequency domain resources for the UE2 according to frequency domain resources actually used when the UE1 transmits the uplink information. For example, assuming that the UE1 actually uses the frequency domain resources represented by the index 0, the gNB may configure for the UE2, frequency domain resources represented by the index 1 shown in FIG. 3. Next, in step S506, the gNB transmits to the UE2, the frequency domain resource indication information, for example, the index 1. In addition, the gNB further transmits to the UE2, the time domain resource indication information, for example, the time domain resources within the COT of the UE1. Next, in step S507, the UE2 transmits uplink information to the gNB within the COT of the UE1 using the frequency domain resources within the BWP configured by the gNB. Therefore, the UE1 and the UE2 share the COT of the UE1 and transmit the uplink information to the gNB using the orthogonal frequency domain resources within the same BWP.

As described above, the first user equipment and the second user equipment may transmit uplink information to the electronic device 200 within the COT of the first user equipment using the orthogonal frequency domain resources within the same BWP. According to an embodiment of the present disclosure, the first user equipment and the second user equipment may transmit the uplink information to the electronic device 200 using different BWPs, which is described in detail below.

According to an embodiment of the present disclosure, the electronic device 200 may receive uplink information from the first user equipment via the communication unit 240. The configuration unit 220 may determine a BWP used for the second user equipment according to a BWP actually used when the first user equipment transmits the uplink information. Here, the configuration unit 220 may configure the BWP for the second user equipment, so that the BWP of the second user equipment is orthogonal to the BWP actually used for the first user equipment.

According to an embodiment of the present disclosure, the configuration unit 220 may determine at least one of multiple BWPs configured for the first user equipment other than the BWP actually used for the first user equipment, as the BWP used for the second user equipment.

For example, the electronic device 200 configures BWP1, BWP2, BWP3 and BWP4 for the first user equipment, and the four BWPs are all in the activated state. The first user equipment transmits uplink information to the electronic device 200 using the BWP1. The configuration unit 220 may determine at least one of the BWP2, the BWP3 and the BWP4 as the BWP used for the second user equipment. For example, the configuration unit 220 may configure the BWP2, BWP5, BWP6 and BWP7 for the second user equipment, or may configure the BWP2, BWP3, the BWP5 and the BWP6 for the second user equipment, or may configure the BWP2, the BWP3, the BWP4 and the BWP5 for the second user equipment.

According to an embodiment of the present disclosure, after acquiring multiple BWPs configured for the second user equipment, the second user equipment may perform the channel detection process on the multiple BWPs, to transmit uplink information within the COT of the first user equipment using a BWP that is detected to be idle in the channel detection process.

As described above, the electronic device 200 may configure multiple BWPs for the first user equipment, and activate one or more of the multiple BWPs. The first user equipment may transmit the uplink information using one or more of the BWPs that are in the activated state. It can be seen that, the number of BWPs configured for the first user equipment is more than one, but the first user equipment may use only a part of the BWPs. In this way, the frequency domain resources are not fully utilized, resulting in low resource utilization of the system. According to the embodiments of the present disclosure, the electronic device 200 may allocate unused BWPs in the BWPs configured for the first user equipment to the second user equipment to improve the resource utilization. Here, the second user equipment may be, for example, a user equipment that just accesses to the electronic device 200. That is, the electronic device 200 does not configure the BWP for the second user equipment. In addition, in the case that the number of the unused BWPs of the first user equipment is more than one, the electronic device 200 may configure the multiple unused BWPs to one user equipment or multiple user equipments. For example, the electronic device 200 configures the BWP1, the BWP2, the BWP3 and the BWP4 for the first user equipment, and the four BWPs are all in the activated state. The first user equipment transmits uplink information to the electronic device 200 using the BWP1. The electronic device 200 may allocate the BWP2 to the second user equipment, may allocate the BWP3 and the BWP4 to the third user equipment, or may allocate the BWP2, the BWP3 and the BWP4 to the second user equipment.

Figure 6:
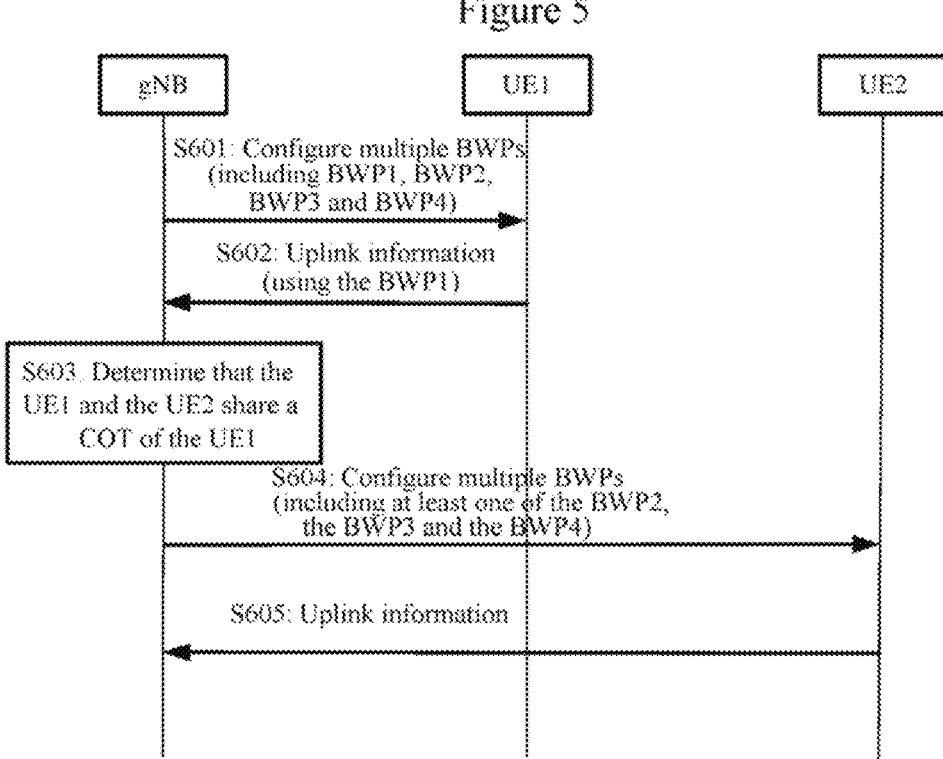
FIG. 6 is a signaling flow chart showing a process that multiple user equipments share a COT of one user equipment according to another embodiment of the present disclosure.

FIG. 6 is a signaling flow chart showing a process that multiple user equipments share a COT of one user equipment according to another embodiment of the present disclosure. In FIG. 6, UE1 represents the first user equipment, UE2 represents the second user equipment, and a gNB represents the electronic device 200. That is, the gNB provides services for the UE1 and the UE2, and the UE1 acquires a right to use the unlicensed frequency band (such as the BWP1) by performing the channel detection process. In step S601, the gNB configures multiple BWPs for the UE1, including the BWP1, the BWP2, the BWP3 and the BWP4. Next, in step S602, the UE1 transmits uplink information to the gNB using the BWP1. Next, in step S603, the gNB determines that the UE1 does not use the BWP2, the BWP3 and the BWP4, thereby determining that the UE2 may share the COT of the UE1. Next, in step S604, the gNB configures multiple BWPs for the UE2, including at least one of the BWP2, the BWP3, and the BWP4. Next, in step S605, the UE2 may perform the channel detection process on the configured multiple BWPs, thereby transmitting uplink information to the gNB within the COT of the UE1 using an idle BWP. Therefore, the UE1 and the UE2 share the COT of the UE1 and transmit uplink information to the gNB using different BWPs.

As described above, a mechanism that an electronic device 200 configures a BWP for a user equipment is actually provided according to the present disclosure. In other words, the electronic device 200 provides services for the first user equipment and the second user equipment, and the electronic device 200 has configured multiple BWPs for the first user equipment, and has not configured a BWP for the second user equipment. The electronic device 200 may include processing circuitry configured to: receive uplink information from the first user equipment; and determine a BWP used for the second user equipment according to a BWP actually used when the first user equipment transmits the uplink information. Here, the electronic device may determine at least one of multiple BWPs configured for the first user equipment other than the BWP actually used for the first user equipment, as the BWP used for the second user equipment.

In other words, according to an embodiment of the present disclosure, the electronic device 200 may configure BWPs not used by the first user equipment for the second user equipment, to avoid waste of resources caused by the BWPs not used by the first user equipment. Here, the BWPs configured for the second user equipment by the electronic device 200 is not limited to be used in the COT of the first user equipment. That is, the second user equipment may freely use the configured BWPs. For example, the second user equipment may perform the channel detection process on multiple BWPs configured by the electronic device 200, to use a BWP that is detected to be idle in the channel detection process. Similarly, in a case that the second user equipment transmits uplink information using one or more of the BWPs, the electronic device 200 may further configure BWPs not used by the second user equipment for other user equipment.

Figure 7:
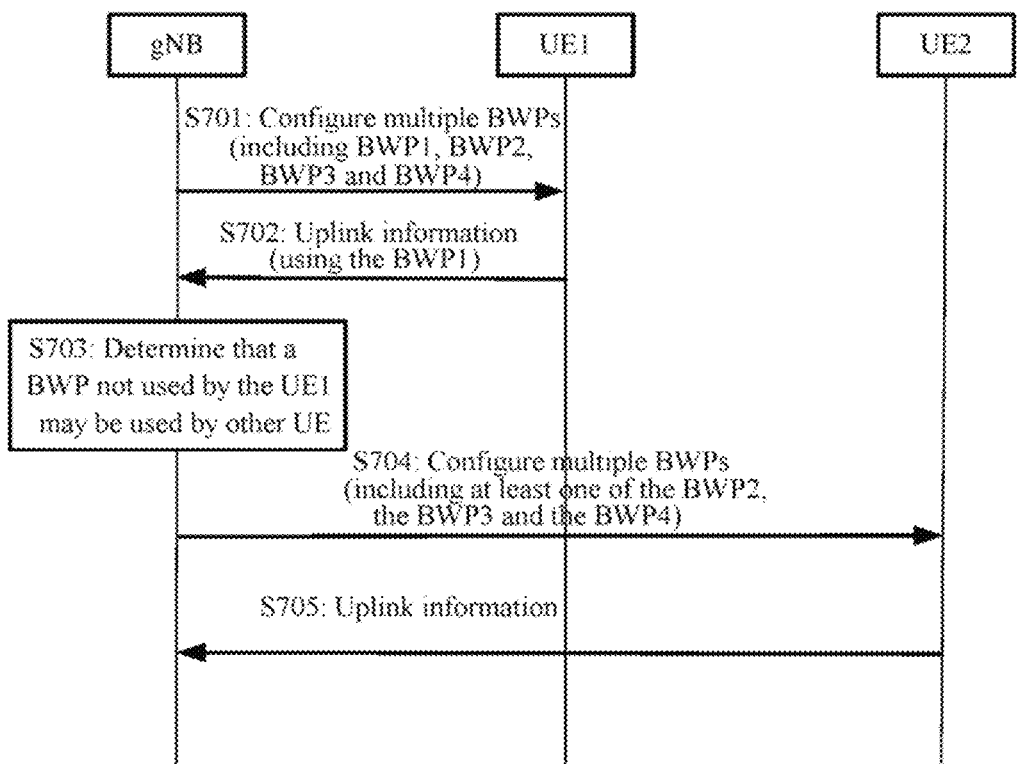
FIG. 7 is a signaling flow chart showing a process that multiple user equipments share a BWP according to an embodiment of the present disclosure.

FIG. 7 is a signaling flow chart showing a process that multiple user equipments share a BWP according to an embodiment of the present disclosure. In FIG. 7, the UE1 represents the first user equipment, the UE2 represents the second user equipment, and the gNB represents the electronic device 200. That is, the gNB provides services for the UE1 and the UE2. In step S701, the gNB configures multiple BWPs for the UE1, including the BWP1, the BWP2, the BWP3 and the BWP4. Next, in step S702, the UE1 transmits uplink information to the gNB using the BWP1. Next, in step S703, the gNB determines that the UE1 does not use the BWP2, the BWP3 and the BWP4, thereby determining that at least one of the BWP2, the BWP3 and the BWP4 may be used by other UE. Next, in step S704, assuming that the UE2 just accesses to the gNB and no BWP is configured for the UE2, the gNB configures multiple BWPs for the UE2, including at least one of the BWP2, the BWP3, and the BWP4. Next, in step S705, the UE2 may perform the channel detection process on the configured multiple BWPs, to transmit uplink information to the gNB using an idle BWP. Therefore, the BWPs not used by the UE1 may be used by other UE.

According to an embodiment of the present disclosure, the electronic device 200 may receive channel detection results of the multiple BWPs from the first user equipment via the communication unit 240. The configuration unit 220 may determine the BWP used for the second user equipment according to the channel detection results of the multiple BWPs.

According to an embodiment of the present disclosure, the channel detection results of the multiple BWPs may include identification information of a BWP that is detected to be idle in the channel detection process. That is, the first user equipment may perform the channel detection process on one or more of BWPs that are in the activated state, to determine whether each of the BWPs that are in the activated state is idle, thereby transmitting the identification information of the idle BWP to the electronic device 200.

According to an embodiment of the present disclosure, the channel detection results of the multiple BWPs may include channel detection results of all the BWPs of the first user equipment that are in the activated state. That is, the first user equipment may perform the channel detection process on one or more of the BWPs that are in the activated state, to determine whether each of the BWPs that are in the activated state is idle, thereby transmitting the channel detection results of all the BWP that are in the activated state to the electronic device 200.

In addition, according to an embodiment of the present disclosure, the channel detection results of the multiple BWPs may not include a channel detection result of the BWP used by the first user equipment.

For example, assuming that the BWPs that are in the activated state of the first user equipment are the BWP1, the BWP2, the BWP3 and the BWP4, the first user equipment performs the channel detection process on the BWP1, the BWP2, the BWP3 and the BWP4, to determine that the BWP1, the BWP2 and the BWP3 are idle and the BWP4 is occupied, and the first user equipment transmits uplink information by selecting the BWP1, thus channel detection results transmitted by the first user equipment to the electronic device 200 may include any one of the following: identification information of the BWP1, the BWP2 and the BWP3 indicating that the BWP1, the BWP2 and the BWP3 are idle; identification information of the BWP2 and the BWP3 indicating that the BWP2 and the BWP3 are idle and not used by the first user equipment; the BWP1, the BWP2 and the BWP3 being idle and the BWP4 being occupied; the BWP2 and the BWP3 being idle and the BWP4 being occupied.

According to an embodiment of the present disclosure, the configuration unit 220 may determine at least one of BWPs detected to be idle by the first user equipment, as the BWP used for the second user equipment.

Here, in a case that one or more of the BWPs detected to be idle by the first user equipment and not used by the first user equipment is the BWP of the second user equipment that is in the activated state, the determination unit 210 determines that the second user equipment may share the COT of the first user equipment. Furthermore, the configuration unit 220 determines the BWP of the second user equipment that is in the activated state among the BWPs detected to be idle by the first user equipment and not used by the first user equipment, as the frequency domain resources for the second user equipment to transmit uplink information.

According to an embodiment of the present disclosure, the configuration unit 220 may further configure time domain resources for the second user equipment to transmit uplink information. The generation unit 230 may generate time domain resource indication information of the second user equipment, to indicate time domain resources used for the second user equipment. Furthermore, the electronic device 200 may further transmit the time domain resource indication information to the second user equipment via the communication unit 240. Here, the electronic device 200 may simultaneously transmit the time domain resource indication information and the frequency domain resource indication information to the second user equipment, or respectively transmit the time domain resource indication information and the frequency domain resource indication information.

According to an embodiment of the present disclosure, the electronic device 200 may receive, from the first user equipment, time domain resources within the COT of the first user equipment, as the time domain resources used for the second user equipment.

Figure 8:
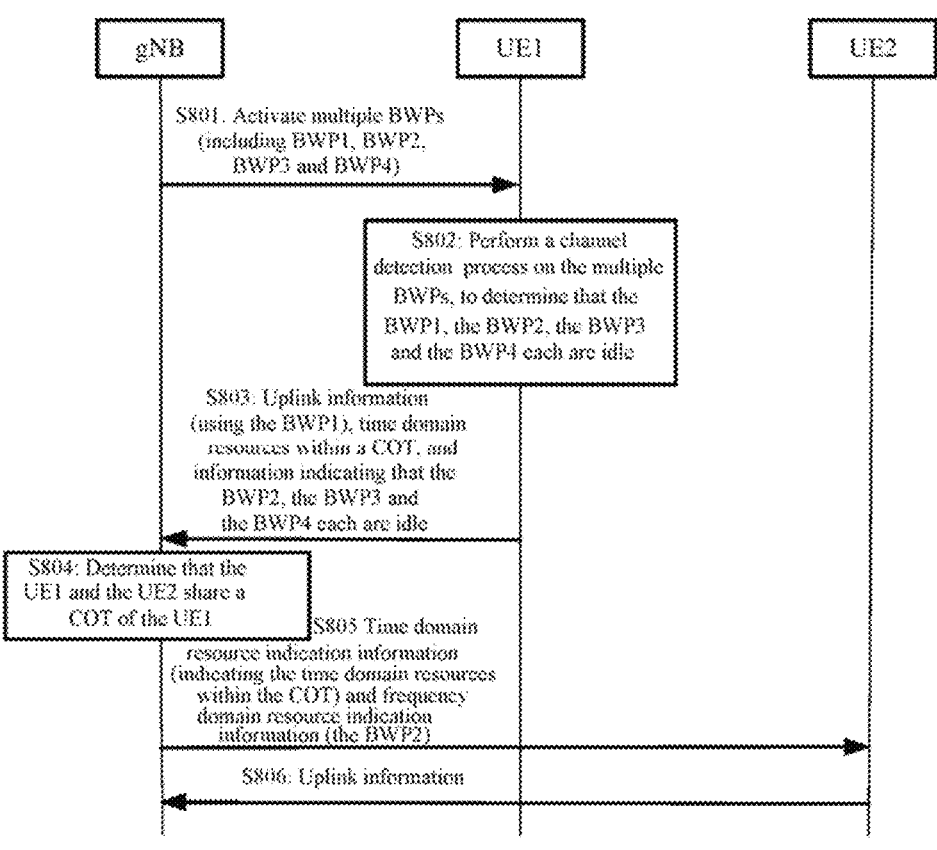
FIG. 8 is a signaling flow chart showing a process that multiple user equipments share a COT of one user equipment according to another embodiment of the present disclosure.

FIG. 8 is a signaling flow chart showing a process that multiple user equipments share a COT of one user equipment according to another embodiment of the present disclosure. In FIG. 8, the UE1 represents the first user equipment, the UE2 represents the second user equipment, and the gNB represents the electronic device 200. That is, the gNB provides services for the UE1 and the UE2. In step S801, the gNB configures multiple BWPs for the UE1, including the BWP1, the BWP2, the BWP3 and the BWP4 that are in the activated state. Next, in step S802, the UE1 performs the channel detection process on each of the BWPs that are in the activated state, to determine that the BWP1, the BWP2, the BWP3 and the BWP4 are idle. Next, in step S803, the UE1 transmit uplink information to the gNB by selecting the BWP1. Furthermore, the UE1 may further transmit time domain resources within a COT of the UE1 to the gNB. Furthermore, the UE1 may further transmit channel detection results of the multiple BWPs to the gNB. For example, the channel detection results include information indicating the BWP2, the BWP3 and the BWP4 each being idle, for example, including identification information of the BWP2, the BWP3 and the BWP4. Next, in step S804, the gNB determines that at least one of the BWP2, the BWP3 and the BWP4 is the BWP of the UE2 that is in the activated state, thereby determining that the UE1 and the UE2 may share the COT of the UE1. It is assumed that the BWP2 is the BWP of the UE2 that is in the activated state. Next, in step S805, the gNB transmits time domain resource indication information (indicating time domain resources within the COT of the UE1) and frequency domain resource indication information (such as the BWP2) to the UE2. Next, in step S806, the UE2 may transmit uplink information to the gNB using the BWP2 within the COT of the UE1. Therefore, the UE1 and the UE2 may share the COT of the UE1, thereby transmitting uplink information to the gNB using different BWPs.

As described above, the first user equipment may transmit channel detection results of the BWP of the first user equipment that is in the activated state to the electronic device 200, so that the electronic device 200 may allocate a BWP that is detected to be idle in the channel detection process and not used by the first user equipment to the second user equipment to use. In this way, the second user equipment can use such BWP without performing the channel detection process or by performing a simple channel detection process. That is, the second user equipment can quickly access to the unlicensed frequency band by using the channel detection results of the first user equipment without performing the channel detection process again.

As described above, according to an embodiment of the present disclosure, the second user equipment may use the BWP that is not used by the first user equipment to improve the resource utilization. Furthermore, the second user equipment may further use the BWP that is not used by the first user equipment and is detected to be idle, by using the channel detection results of the first user equipment, thereby improving speed for accessing to the unlicensed frequency band by the second user equipment without performing the channel detection process.

According to an embodiment of the present disclosure, as shown in FIG. 2, the electronic device 200 may further include a feedback unit 250. The feedback unit 250 is configured to transmit, in response to the uplink information from the first user equipment, feedback information to the first user equipment using each of multiple BWPs of the first user equipment that are in the activated state.

According to an embodiment of the present disclosure, the electronic device 200 may receive the uplink information from a part of the multiple BWPs of the first user equipment that are in the activated state, and transmit feedback information to the first user equipment using all of the multiple BWPs of the first user equipment that are in the activated state. In this way, probability of the feedback information being successfully received and decoded can be improved.

Figure 9:
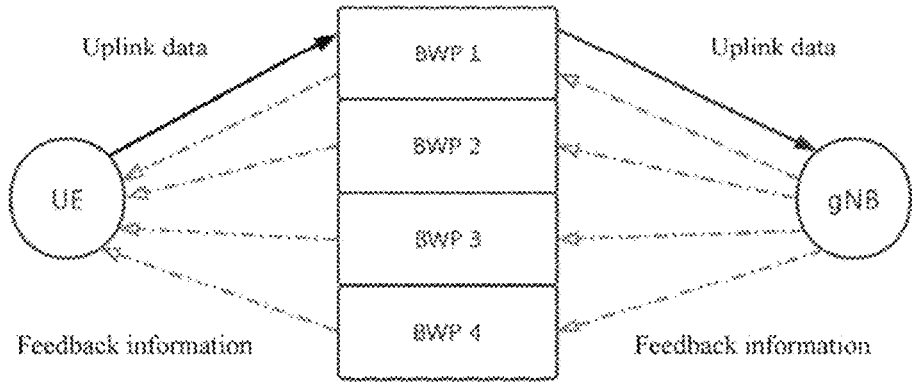
FIG. 9 is a schematic diagram showing a process of transmitting feedback information using multiple BWPs according to an embodiment of the present disclosure.

FIG. 9 is a schematic diagram showing a process of transmitting feedback information using multiple BWPs according to an embodiment of the present disclosure. As shown in FIG. 9, the UE represents a user equipment within coverage of the gNB. The user equipment has four BWPs that are in the activated state: the BWP1, the BWP2, the BWP3 and the BWP4. According to an embodiment of the present disclosure, the UE transmits uplink data to the gNB using the BWP1, and the gNB may transmit feedback information to the UE using each of the BWP1, the BWP2, the BWP3 and the BWP4. The feedback information may include, for example, ACK/NACK information.

As described above, a mechanism for transmitting control information is actually provided according to the present disclosure. That is, the electronic device 200 may include processing circuitry. The processing circuitry is configured to: receive, from a user equipment served by the electronic device 200, uplink information within a part or all of multiple BWPs of the user equipment that are in the activated state; and transmit control information to the user equipment within each of the multiple BWPs of the user equipment that are in the activated state. The control information herein may be, for example, feedback information of the ACK/NACK.

According to an embodiment of the present disclosure, the electronic device 200 may further receive uplink information transmitted by using a BWP after being switched from the first user equipment via the communication unit 240; and receive indication information for indicating channel conditions of a BWP before being switched from the first user equipment.

As described above, according to an embodiment of the present disclosure, after being switched to a BWP, the first user equipment may transmit the indication information for indicating the channel conditions of the BWP before being switched to the electronic device 200. The indication information herein may include Signal to Interference Ratio (SIR), Signal to Interference plus Noise Ratio (SINR), Signal Noise Ratio (SNR), Channel Quality Indication (CQI) and the like of the BWP before being switched. The indication information is not limited in the present disclosure. Furthermore, the indication information may further include identification information of the BWP before being switched. In this way, the electronic device 200 configures a BWP for other user equipment with reference to the indication information transmitted by the first user equipment.

According to an embodiment of the present disclosure, as shown in FIG. 2, the electronic device 200 further includes a setting unit 260. The setting unit 260 is configured to configure a BWP, set an activation state of the BWP, and set various parameters of the BWP and the like for a user equipment within coverage of the electronic device 200.

According to an embodiment of the present disclosure, the setting unit 260 may set a user-specific parameter of the BWP used for the second user equipment as a default value. Specifically, the user-specific parameter may include a user-specific RRC configuration parameter, such as a beamFailureRecoveryConfig parameter, and a pucch-Config parameter. That is, in a case that the electronic device 200 determines that a BWP configured for the first user equipment is reallocated to the second user equipment, the user-specific parameter of such BWP is required to be set as the default value, so that the second user equipment may use such BWP.

It can be seen that according to the electronic device 200 in the embodiment of the present disclosure, the second user equipment may share the COT of the first user equipment. That is, the first user equipment and the second user equipment may transmit uplink information within the COT of the first user equipment using orthogonal frequency domain resources. In this way, the second user equipment can access to the unlicensed frequency band without performing the channel detection process again, thereby greatly reducing time for the second user equipment to access to the unlicensed frequency band. Here, the first user equipment and the second user equipment may use orthogonal frequency domain resources within a same BWP or different BWPs. Furthermore, the electronic device 200 may configure BWPs not used by the first user equipment for the second user equipment, to avoid waste of resources caused by the BWPs not used by the first user equipment. In addition, the electronic device 200 may further transmit control information to a user equipment within each of multiple BWPs of the user equipment that are in the activated state within coverage of the electronic device 200, thereby improving the probability of the control information being successfully received.

Therefore, an enhanced mechanism for using a BWP is provided according to the present disclosure, thereby improving the resource utilization of the system, reducing the time for the user equipment to access to the unlicensed frequency band, and reducing delay of information.

3. Configuration Examples of Electronic Device for User Side

Figure 10:
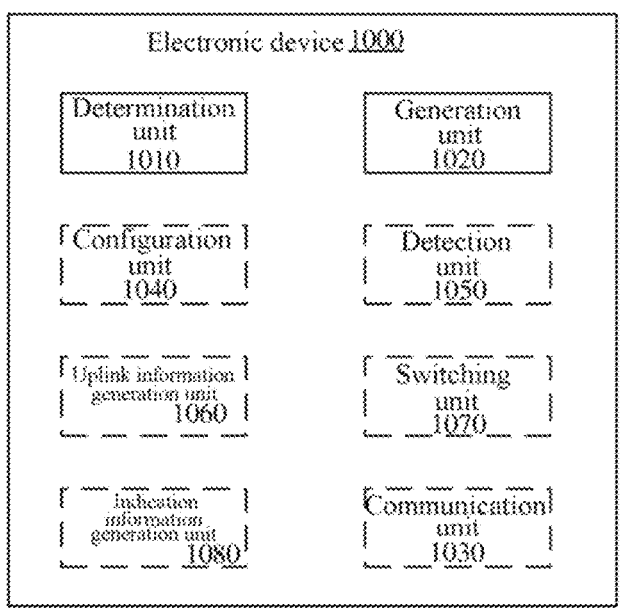
FIG. 10 is a block diagram showing a configuration example of an electronic device for a user side according to an embodiment of the present disclosure.

FIG. 10 is a structural block diagram showing an electronic device 1000 in a wireless communication system according to an embodiment of the present disclosure. The electronic device 1000 may serve as a user side device in the wireless communication system. As shown in FIG. 10, the electronic device 1000 may include a determination unit 1010 and a generation unit 1020.

Here, each unit of the electronic device 1000 may be included in processing circuitry. It should be noted that, the electronic device 1000 may include one processing circuitry or multiple processing circuitries. Furthermore, the processing circuitry may include various discrete functional units to perform various different functions and/or operations. It should be noted that these functional units may be physical entities or logical entities, and units with different names may be implemented by a same physical entity.

According to an embodiment of the present disclosure, the determination unit 1010 may determine that other user equipment shares a COT of the electronic device 1000 in time domain. The other user equipment and the electronic device 1000 transmit uplink information to a network side device within the COT of the electronic device 1000 using orthogonal frequency domain resources. Here, other user equipment and the electronic device 1000 are within a service range of the network side device.

According to an embodiment of the present disclosure, the generation unit 1020 may generate time domain resource indication information of other user equipment, to indicate time domain resources used for the other user equipment.

As described above, according to the embodiment of the present disclosure, the electronic device 1000 may determine that other user equipment shares the COT of the electronic device 1000, to generate the time domain resource indication information of the other user equipment. In this way, the other user equipment and the electronic device 1000 may transmit uplink information to the network side device within the COT of the electronic device 1000 using orthogonal frequency domain resources, so that the other user equipment can access to an unlicensed frequency band without performing a channel detection process, thereby improving the speed for other user equipment to access to the unlicensed frequency band.

The determination process of the determination unit 1010 is not limited in the present disclosure. For example, the determination unit 1010 may determine that other user equipment may share the COT of the electronic device 1000 in a case that a channel condition of a to-be-used BWP is determined to be good, or the electronic device 1000 receives indication information from the network side device to determine that other user equipment is required to share the COT the electronic device 1000. Here, the electronic device 1000 may not determine which user equipment (equipments) can share the COT, but may only determine that other user equipment may share the COT of the electronic device 1000.

According to an embodiment of the present disclosure, the generation unit 1020 may determine time domain resources within the COT of the electronic device 1000 as time domain resources of other user equipment. That is, time domain resource indication information may include, for example, starting time and ending time of the COT of the electronic device 1000.

According to an embodiment of the present disclosure, as shown in FIG. 10, the electronic device 1000 may further include a communication unit 1030. The communication unit 1030 is configured to transmit information to devices other than the electronic device 1000, and/or receive information from devices other than the electronic device 1000.

According to an embodiment of the present disclosure, the electronic device 1000 may transmit time domain resource indication information of other user equipment, to the other user equipment or the network side device via the communication unit 1030. Here, in a case that the electronic device 1000 transmits the time domain resource indication information of other user equipment to the network side device, the network side device may forward the time domain resource indication information of the other user equipment to the other user equipment. In a case that the electronic device 1000 transmits the time domain resource indication information of other user equipment to other user equipment, the electronic device 1000 may transmit the time domain resource indication information by broadcasting.

According to an embodiment of the present disclosure, the electronic device 1000 and other user equipment may transmit uplink information to the network side device using orthogonal frequency domain resources within a same BWP.

According to an embodiment of the present disclosure, the electronic device 1000 may receive, from the network side device, the frequency domain resource indication information of the electronic device 1000 via the communication unit 1030.

Furthermore, according to an embodiment of the present disclosure, as show in FIG. 10, the electronic device 1000 may further include a configuration unit 1040. The configuration unit 1040 is configured to determine frequency domain resources used when the electronic device 1000 transmits the uplink information according to the frequency domain resource indication information. Here, the frequency domain resource indication information of the electronic device 1000 indicates an index used for frequency domain resources of the electronic device 1000, and the indexes of the frequency domain resources have a mapping relationship with frequency domain resources within the BWP. For example, in a case that the electronic device 1000 receives an index 0, it is determined that a location of the frequency domain resources represented by the index 0 shown in FIG. 3 in frequency domain. Furthermore, after determining the frequency domain resources for transmitting uplink information, the electronic device 1000 may transmit uplink information to the network side device within the COT of the electronic device 1000 using the above frequency domain resources. In addition, the electronic device 1000 may simultaneously transmit uplink information and time domain resource indication information, which is described in detail in the description of the electronic device 200, and is not repeated herein.

According to an embodiment of the present disclosure, the electronic device 1000 may transmit to other electronic device frequency domain resources used when the electronic device 1000 transmits the uplink information via the communication unit 1030. For example, the electronic device 1000 may broadcast the frequency domain resources used when the electronic device 1000 transmits the uplink information. For example, the electronic device 1000 may represent the frequency domain resources used when the electronic device 1000 transmits the uplink information by using the index of the frequency domain resource. Furthermore, the electronic device 1000 may simultaneously transmit the time domain resource indication information of other user equipment and the frequency domain resources used when the electronic device 1000 transmits the uplink information, or respectively transmit the time domain resource indication information of other user equipment and the frequency domain resources used when the electronic device 1000 transmits the uplink information.

In this way, other user equipment may determine the time domain resources within the COT of the electronic device 1000 after receiving the time domain resource indication information. Furthermore, after receiving the frequency domain resources used when the electronic device 1000 transmits uplink information, other user equipment may transmit uplink information by selecting frequency domain resources orthogonal to the frequency domain resources used by electronic device 1000. In addition, in a case that other user equipment determines that a BWP used by electronic device 1000 is a BWP of other user equipment that is in the activated state, it is determined that the other user equipment may share the COT of the electronic device 1000, and may transmit uplink information by selecting frequency domain resources orthogonal to the frequency domain resources used by the electronic device 1000.

Figure 11:
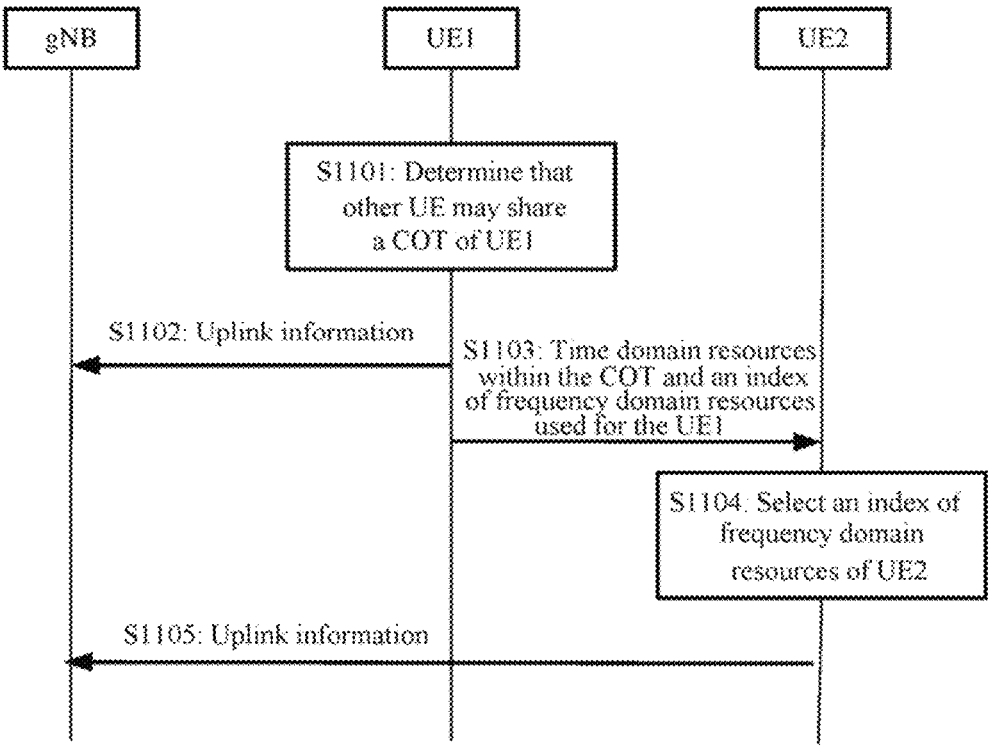
FIG. 11 is a signaling flow chart showing a process that multiple user equipments share a COT of one user equipment according to another embodiment of the present disclosure.

FIG. 11 is a signaling flow chart showing a process that multiple user equipments share a COT of one user equipment according to another embodiment of the present disclosure. In FIG. 11, the UE1 represents the electronic device 1000, the UE2 represents other user equipment, and the gNB represents the network side device. That is, the gNB provides services for the UE1 and the UE2, the UE1 acquires a right to use the unlicensed frequency band (such as a specific BWP) by performing a channel detection process. As shown in FIG. 11, in step S1101, the UE1 determines that other user equipment may share a COT of the UE1. Next, in step S1102, the UE1 transmits uplink information to the gNB. It is assumed that the UE1 transmits uplink information to the gNB using the frequency domain resources represented by the index 0 shown in FIG. 3. Next, in step S1103, the UE1 broadcasts time domain resource indication information, for example, including time domain resources within the COT of the UE1. Furthermore, the UE1 may further broadcast frequency domain resources used by the UE1, for example, including the index 0. Next, in step S1104, after receiving information transmitted by the UE1, the UE2 determines that the UE1 uses the frequency domain resources represented by the index 0, and that a BWP used by the UE1 is a BWP of the UE2 that is in the activated state. Therefore, the UE2 may determine that the UE2 may share the COT of the UE1, and select the frequency domain resources orthogonal to the UE1, for example, the frequency domain resources represented by the index 1 shown in FIG. 3. Next, in step S1105, the UE2 may transmit uplink information to the gNB within the COT of the UE1 by selecting the frequency domain resources. Therefore, the UE1 and the UE2 transmit uplink information to the gNB within the COT of the UE1 using orthogonal frequency domain resources within a same BWP.

According to an embodiment of the present disclosure, the electronic device 1000 and other user equipment may transmit uplink information to the network side device using different BWPs.

According to an embodiment of the present disclosure, as shown in FIG. 10, the electronic device 1000 may include a detection unit 1050. The detection unit 1050 is configured to perform a channel detection process. Here, the electronic device 1000 may perform the channel detection process on each of multiple BWPs of the electronic device 1000 that are in the activated state.

According to an embodiment of the present disclosure, the electronic device 1000 may further include an uplink information generation unit 1060. The uplink information generation unit 1060 is configured to generate uplink information. Here, the electronic device 1000 may transmit uplink information to the network side device using a BWP that is detected to be idle in the channel detection process.

According to an embodiment of the present disclosure, the electronic device 1000 may transmit channel detection results of the multiple BWPs to the network side device via the communication unit 1030, so that the network side device determines at least one of the BWPs that are detected to be idle by the electronic device 1000 as a BWP used for other user equipment.

As described above, the channel detection results of the multiple BWPs may include identification information of a BWP that is detected to be idle in the channel detection process. The channel detection results of the multiple BWPs may include channel detection result of each of the BWPs that are in the activated state. In addition, according to an embodiment of the present disclosure, the channel detection results of the multiple BWPs may not include channel detection result of a BWP used by the electronic device 1000.

According to an embodiment of the present disclosure, the electronic device 1000 may further transmit a BWP that is detected to be idle in the channel detection process and is not used by the electronic device 1000 to other user equipment via the communication unit 1030, for the other user equipment to transmit uplink information. Here, the electronic device 1000 may transmit the BWP that is detected to be idle in the channel detection process and is not used by the electronic device 1000 by broadcasting. Furthermore, the electronic device 1000 may simultaneously transmit the time domain resource indication information and the BWP that is detected to be idle in the channel detection process and is not used by the electronic device 1000, or may respectively transmit the time domain resource indication information and the BWP that is detected to be idle in the channel detection process and is not used by the electronic device 1000.

Figure 12:
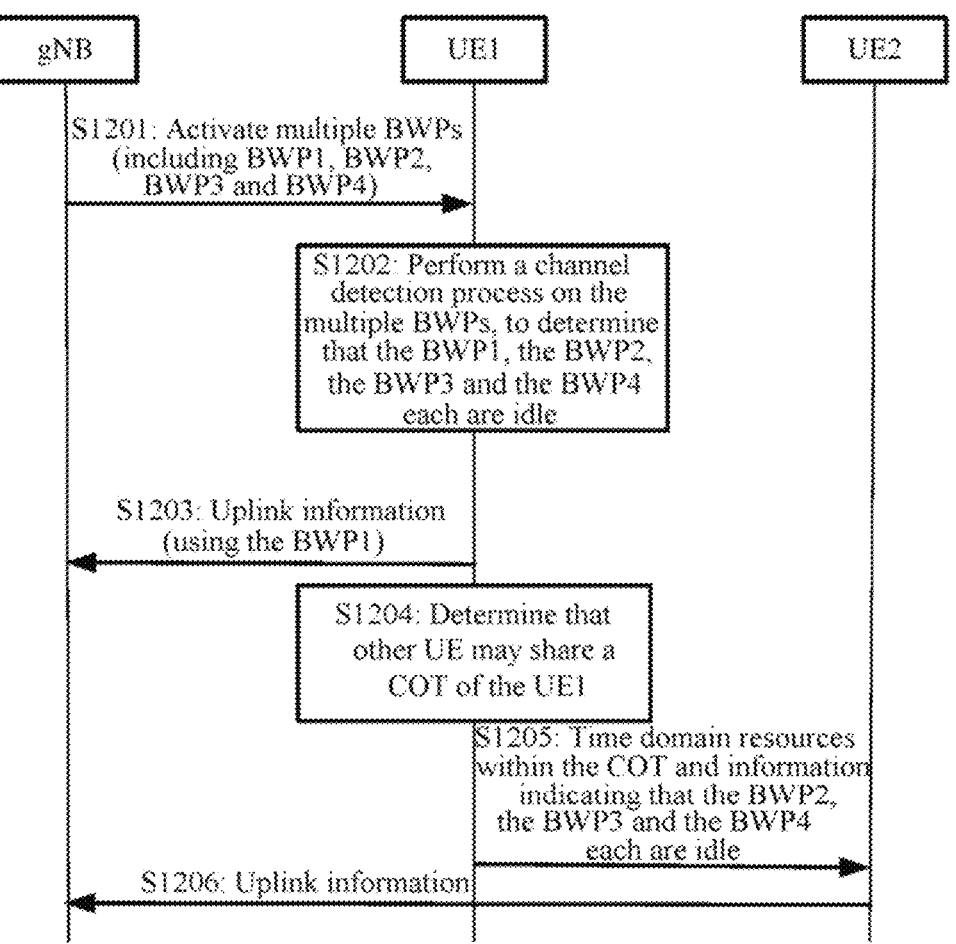
FIG. 12 is a signaling flow chart showing a process that multiple user equipments share a COT of one user equipment according to another embodiment of the present disclosure.

FIG. 12 is a signaling flow chart showing a process that multiple user equipments share a COT of one user equipment according to another embodiment of the present disclosure. In FIG. 12, the UE1 represents the electronic device 1000, the UE2 represents other user equipment, and the gNB represents the network side device. That is, the gNB provides services for the UE1 and the UE2. In step S1201, the gNB configures multiple BWPs for the UE1, including BWP1, the BWP2, the BWP3 and the BWP4 that are in the activated state. Next, in step S1202, the UE1 performs the channel detection process on each of the BWPs that are in the activated state, to determine that the BWP1, the BWP2, the BWP3 and the BWP4 each are idle. Next, in step S1203, the UE1 transmits uplink information to the gNB by selecting the BWP1. Next, in step S1204, the UE1 determines that other user equipment may share a COT of the UE1. Next, in step S1205, the UE1 broadcasts time domain resources within the COT of the UE1. Furthermore, the UE1 may further broadcast channel detection results of multiple BWPs. For example, the channel detection results include information indicating the BWP2, the BWP3 and the BWP4 each being idle, for example, including identification information of the BWP2, the BWP3 and the BWP4. Next, in step S1206, the UE2 determines that at least one of the BWP2, the BWP3 and the BWP4 is a BWP of the UE2 that is in the activated state. It is assumed that the BWP2 is the BWP of the UE2 that is in the activated state. Therefore, the UE2 may transmit uplink information to the gNB within the COT of the UE1 using the BWP2. Here, the UE2 may not perform the channel detection process or may perform a simple channel detection process in the process of using the BWP2. Therefore, the UE1 and the UE2 may share the COT of the UE1, to transmit uplink information to the gNB using different BWPs.

According to an embodiment of the present disclosure, the electronic device 1000 may transmit uplink information to the network side device via the communication 1030, and receive feedback information from the network side device using each of multiple BWPs of the electronic device 1000 that are in the activated state.

According to an embodiment of the present disclosure, as shown in FIG. 10, the electronic device 1000 may further include a switching unit 1070. The switching unit 1070 is configured to switch to another BWP among the multiple BWPs that are in the activated state configured for the electronic device 1000, in a case that no feedback information is received from the network side device within a predetermined time.

Here, the switching unit 1070 may be provided with a timer. The electronic device 1000 receives no feedback information from the network side device when the timer expires, thus the switching unit 1070 may determine that the electronic device 1000 is required to be switched to another BWP.

According to an embodiment of the present disclosure, the detection unit 1050 may perform the channel detection process on the multiple BWPs that are in the activated state configured for the electronic device 1000, so that the switching unit 1070 may switch the electronic device 1000 to a BWP that is detected to be idle in the channel detection process among the multiple BWPs that are in the activated state. Here, in a case that the number of the idle BWP among the multiple BWPs that are in the activated state configured for the electronic device 1000 is one, the switching unit 1070 may switch the electronic device 1000 to the idle BWP. In a case that the number of the idle BWPs among the multiple BWPs that are in the activated state configured for the electronic device 1000 is more than one, the switching unit 1070 may switch the electronic device 1000 to any one of the multiple idle BWPs.

According to an embodiment of the present disclosure, the BWPs of the electronic device 1000 that are in the activated state other than the BWP being in the activated state before being switched may (in any one of the ways described above) be used by other user equipment. Therefore, the electronic device 1000 is required to perform the channel detection process before being switched to a BWP.

If a BWP is detected to be idle in the channel detection process, it is indicated that the BWP is not used by other user equipment, and the electronic device 1000 may be switched to such BWP.

According to an embodiment of the present disclosure, as shown in FIG. 10, the electronic device 1000 may further include an indication information generation unit 1080. The indication information generation unit 1080 is configured to simultaneously transmit uplink information using a BWP after being switched and transmit indication information indicating channel conditions of a BWP before being switched to the network side device. The indication information herein may include Signal to Interference Ratio (SIR), Signal to Interference plus Noise Ratio (SINR), Signal Noise Ratio (SNR), Channel Quality Indication (CQI) and the like of the BWP before being switched. Types of the indication information are not limited in the present disclosure. In addition, the indication information may further include identification information of the BWP before being switched. In a non-limiting embodiment, in a case that the electronic device 1000 is provided with four BWPs, the indication information generation unit 1080 may indicate identification of the BWP before being switched by using two bits. Furthermore, the indication information generation unit 1080 may further indicate the CQI of the BWP before being switched by using four bits. Therefore, the indication information generated by the indication information generation unit 1080 may include six bits.

According to an embodiment of the present disclosure, the indication information generation unit 1080 may carry such instruction information using Uplink Control Information (UCI).

As described above, a mechanism for automatically switching a BWP is actually provided according to the present disclosure. That is, the electronic device 1000 according to the embodiment of the present disclosure includes processing circuitry. The processing circuitry is configured to: transmit uplink information using one of the multiple BWPs that are in the activated state to the network side device; and switch to another BWP among the multiple BWPs that are in the activated state, in a case that no feedback information is received from the network side device within a predetermined time. In an embodiment, the processing circuitry is configured to: perform the channel detection process on multiple BWPs that are in the activated state configured for the electronic device 1000; and switch the electronic device 1000 to a BWP that is detected to be idle in the channel detection process among the multiple BWPs that are in the activated state.

As described above, it is assumed that the electronic device 1000 transmits uplink information to the network side device using the BWP that are in the activated state. For some services sensitive to delay, if the electronic device 1000 receives no feedback information from the network side device, the electronic device 1000 is required to be switched to another BWP that is in the activated state to re-transmit the uplink information to the network side device. In this case, the network side device is required to schedule, and the switching process is complex and time-consuming, resulting in not meeting low delay requirements of the services. According to the embodiment of the present disclosure, in the case that no feedback information is received from the network side device within a predetermined time, the electronic device 1000 may perform automatically a switching process, to cause the electronic device 1000 to be switched to another idle BWP that is in the activated state. In this way, the switching process can be simplified, thereby meeting the low delay requirements of some services.

It can be seen that according to the electronic device 1000 in the embodiment of the present disclosure, other user equipment may share the COT of the electronic device 1000. That is, other user equipment and the electronic device 1000 may transmit uplink information using orthogonal frequency domain resources within the COT of the electronic device 1000. In this way, other user equipment can access to an unlicensed frequency band without performing the channel detection process, thereby greatly reducing the time for other user equipment to access to the unlicensed frequency band. Here, other user equipment and the electronic device 1000 may use orthogonal frequency domain resources within a same BWP, or may use orthogonal frequency domain resources within different BWPs. In addition, the electronic device 1000 may further receive control information from the network side device by each of the multiple BWPs that are in the activated state, to improve the probability of the control information being successfully received. Furthermore, in the case that no feedback information is received from the network side device within a predetermined time, the electronic device 1000 may be switched to another BWP among the multiple BWPs that are in the activated state, thereby reducing signaling in the switching process and meeting the low delay requirements of the services. Therefore, an enhanced mechanism for using a BWP is provided according to the present disclosure, thereby improving the resource utilization of the system, reducing the time for a user equipment to access to the unlicensed frequency band, and reducing the delay of information.

According to an embodiment of the present disclosure, the electronic device 200 may serve as the network side device, and the electronic device 1000 may serve as the user equipment. That is, the electronic device 200 may provide services for the electronic device 1000. Therefore, all the embodiments of the electronic device 200 described above are applicable to this.

4. Method Embodiments

Next, a wireless communication method performed by an electronic device 200 for a network side in a wireless communication system according to embodiments of the present disclosure is described in detail. Here, the electronic device 200 may serve a first user equipment and a second user equipment.

Figures 13, 14:
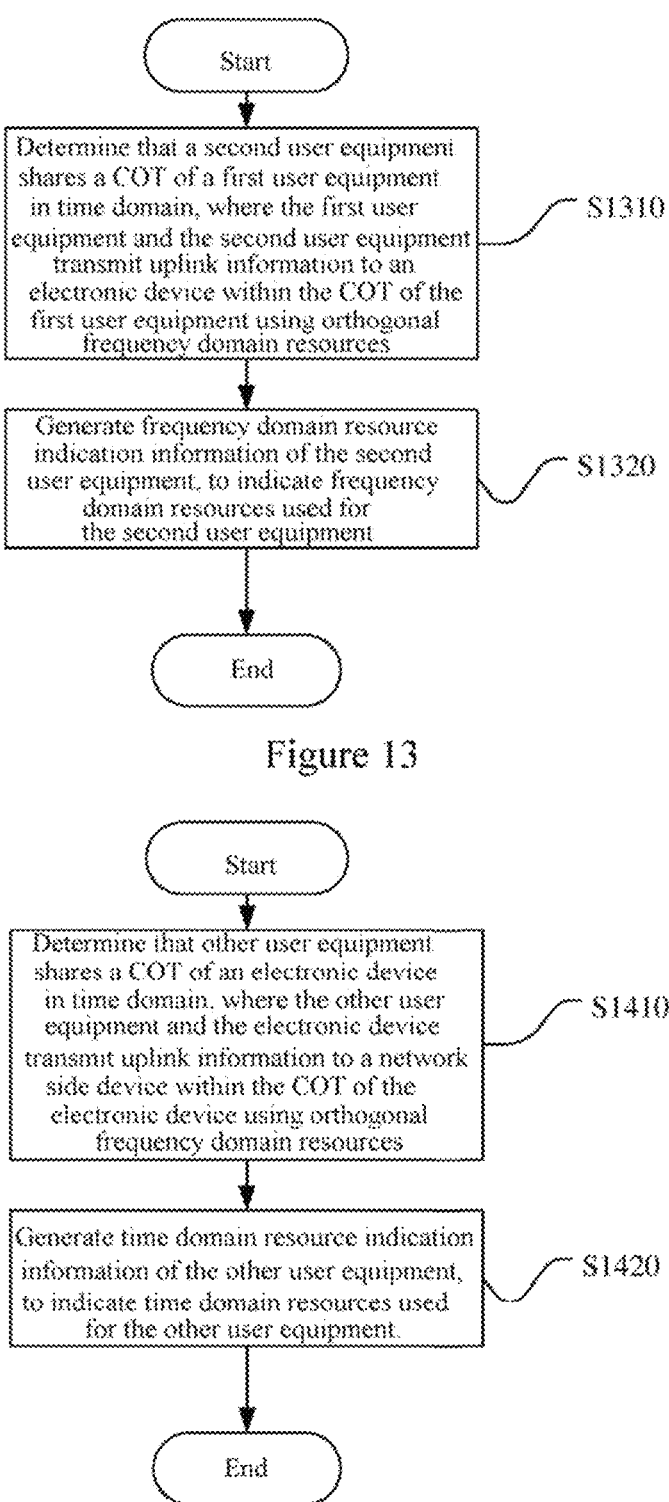
FIG. 13 is a flow chart showing a wireless communication method performed by an electronic device for a network side according to an embodiment of the present disclosure.
FIG. 14 is a flow chart showing a wireless communication method performed by an electronic device for a user side according to an embodiment of the present disclosure.

FIG. 13 is a flow chart showing a wireless communication method performed by an electronic device 200 for a network side in a wireless communication system according to an embodiment of the present disclosure.

As shown in FIG. 13, in step S1310, it is determined that a second user equipment shares a COT of a first user equipment in time domain. The first user equipment and the second user equipment transmit uplink information to an electronic device within the COT of the first user equipment using orthogonal frequency domain resources.

Next, in step S1320, frequency domain resource indication information of the second user equipment is generated, to indicate frequency domain resources used for the second user equipment.

In an embodiment, the first user equipment and the second user equipment transmit uplink information to the electronic device 200 using orthogonal frequency domain resources within a same BWP.

In an embodiment, the wireless communication method further includes: generating frequency domain resource indication information of the first user equipment, to indicate frequency domain resources used for the first user equipment.

In an embodiment, the frequency domain resource indication information of the second user equipment indicates an index of frequency domain resources used for the second user equipment, and the frequency domain resource indication information of the first user equipment indicates an index of frequency domain resources used for the first user equipment. The indexes of the frequency domain resources have a mapping relationship with frequency domain resources within the BWP.

In an embodiment, the wireless communication method further includes: receiving uplink information from the first user equipment; and determining, according to frequency domain resources actually used when the first user equipment transmits the uplink information, frequency domain resources used for the second user equipment.

In an embodiment, the wireless communication method further includes: generating time domain resource indication information of the second user equipment, to indicate time domain resources used for the second user equipment.

In an embodiment, the wireless communication method further includes: receiving, from the first user equipment, time domain resources within the COT of the first user equipment, as the time domain resources used for the second user equipment.

In an embodiment, the BWP is a BWP of the first user equipment that is in an activated state and is a BWP of the second user equipment that in an activated state.

In an embodiment, the first user equipment and the second user equipment transmit uplink information to the electronic device 200 using different BWPs.

In an embodiment, the wireless communication method further includes: receiving uplink information from the first user equipment; and determining, according to a BWP actually used when the first user equipment transmits the uplink information, a BWP used for the second user equipment.

In an embodiment, the process of determining the BWP used for the second user equipment further includes: determining at least one of multiple BWPs configured for the first user equipment other than the BWP actually used by the first user equipment, as the BWP used for the second user equipment.

In an embodiment, the process of determining the BWP used for the second user equipment further includes: receiving channel detection results of the multiple BWPs from the first user equipment; and determining the BWP used for the second user equipment according to the channel detection results of the multiple BWPs.

In an embodiment, the process of determining the BWP used for the second user equipment further includes: determining at least one of BWPs that are detected to be idle by the first user equipment as the BWP used for the second user equipment.

In an embodiment, the wireless communication method further includes: generating time domain resource indication information of the second user equipment, to indicate time domain resources used for the second user equipment.

In an embodiment, the wireless communication method further includes: receiving, from the first user equipment, time domain resources within the COT of the first user equipment, as the time domain resources used for the second user equipment.

In an embodiment, the wireless communication method further includes: receiving uplink information from the first user equipment; and transmitting, in response to the uplink information from the first user equipment, feedback information to the first user equipment using each of multiple BWPs of the first user equipment that are in the activated state.

In an embodiment, the wireless communication method further includes: receiving, from the first user equipment, uplink information transmitted by using the BWP after being switched; and receiving indication information for indicating channel conditions of the BWP before being switched from the first user equipment.

In an embodiment, the wireless communication method further includes: setting a user-specific parameter of the BWP used for the second user equipment as a default value.

According to the embodiment of the present disclosure, a main body performing the above method may be the electronic device 200 according to the embodiment of the present disclosure, and thus all the embodiments of the electronic device 200 described above are applicable here.

Next, a wireless communication method performed by the electronic device 1000 for a user side in a wireless communication system according to an embodiment of the present disclosure is described in detail.

FIG. 14 is a flow chart showing a wireless communication method performed by an electronic device 1000 for a user side in a wireless communication system according to an embodiment of the present disclosure.

As shown in FIG. 14, in step S1410, it is determined that other user equipment shares a Channel Occupy Time (COT) of an electronic device 1000 in time domain. The other user equipment and the electronic device transmit uplink information to a network side device within the COT of the electronic device 1000 using orthogonal frequency domain resources.

Next, in step S1420, time domain resource indication information of the other user equipment is generated, to indicate time domain resources used for the other user equipment.

In an embodiment, the wireless communication method further includes: transmitting the time domain resource indication information of the other user equipment, to the other user equipment or the network side device.

In an embodiment, the electronic device 1000 and the other user equipment transmit uplink information to the network side device using orthogonal frequency domain resources within a same BWP.

In an embodiment, the wireless communication method further includes: receiving, from the network side device, frequency domain resource indication information of the electronic device 1000; and determining, according to the frequency domain resource indication information, frequency domain resources used when the electronic device 1000 transmits the uplink information.

In an embodiment, the frequency domain resource indication information of the electronic device 1000 indicates an index of frequency domain resources used for the electronic device 1000. The indexes of the frequency domain resources have a mapping relationship with frequency domain resources within the BWP.

In an embodiment, the wireless communication method further includes: transmitting the frequency domain resources used when the electronic device 1000 transmits the uplink information to other user equipment, so that the other user equipment transmits the uplink information by selecting frequency domain resources orthogonal to the frequency domain resources used for the electronic device 1000.

In an embodiment, the electronic device 1000 and other user equipment transmit uplink information to the network side device using different BWPs.

In an embodiment, the wireless communication method further includes: performing a channel detection process on multiple BWPs; and transmitting uplink information to the network side device using a BWP that is detected to be idle in the channel detection process.

In an embodiment, the wireless communication method further includes: transmitting channel detection results of the multiple BWPs to the network side device, so that the network side device determines at least one of BWPs that are detected to be idle by the electronic device 1000 as a BWP used for other user equipment.

In an embodiment, the wireless communication method further includes: transmitting, a BWP that is detected to be idle in the channel detection process and is not used by the electronic device 1000 to other user equipment, for the other user equipment to transmit uplink information.

In an embodiment, the wireless communication method further includes: transmitting uplink information to the network side device; and receiving feedback information from the network side device using each of multiple BWPs of the electronic device 1000 that are in the activated state.

In an embodiment, the wireless communication method further includes: transmitting uplink information to the network side device; and switching the electronic device 1000 to one of multiple BWPs that are in the activated state configured for the electronic device 1000, in a case that no feedback information is received from the network side device within a predetermined time.

In an embodiment, the wireless communication method further includes: performing a channel detection process on the multiple BWPs that are in the activated state configured for the electronic device 1000; and switching the electronic device 1000 to a BWP that is detected to be idle in the channel detection process among the multiple BWPs that are in the activated state.

In an embodiment, the wireless communication method further includes: transmitting uplink information to the network side device using a BWP after being switched; and transmitting indication information indicating channel conditions of a BWP before being switched to the network side device.

According to the embodiment of the present disclosure, a main body performing the above method may be the electronic device 1000 according to the embodiment of the present disclosure, and thus all the embodiments of the electronic device 1000 described above are applicable here.

5. Application Examples

The technology of the present disclosure may be applied to various products.

The network side device may be implemented as any type of TRP. The TRP may have a function of transmitting and receiving. For example, the TRP may receive information from a user equipment and a base station apparatus, and may further transmit information to the user equipment and the base station apparatus. In a typical example, the TRP may provide services for the user equipment and may also be controlled by the base station apparatus. Furthermore, the TRP may have a structure similar to structures of base station apparatuses described below, or may only have a structure related to information transmitting and receiving in the base station apparatus.

The network side device may further be implemented as any type of base station apparatuses, such as a macro eNB and a small eNB, and may further be implemented as any type of gNB (a base station in a 5G system). The small eNB may be an eNB covering a cell smaller than a macro cell, such as a pico eNB, a micro eNB or a home (femto) eNB. Alternatively, the base station may be implemented as any other type of base station, such as a NodeB and a base transceiver station (BTS). The station base may include: a main body (also referred to as a base station apparatus) configured to control wireless communication; and one or more remote radio heads (RRH) arranged at positions different from the main body.

The user equipment may be implemented as mobile terminals (such as a smart phone, a tablet personal computer (PC), a notebook PC, a portable game terminal, a portable/dongle mobile router and a digital camera) or a vehicle terminal (such as a car navigation apparatus). The user equipment may be implemented as a terminal (also known as machine type communication (MTC) terminal) that performs machine to machine (M2M) communication. In addition, the user equipment may be a wireless communication module (such as an integrated circuit module including one wafer) installed on each of the above user equipments.

Application Example on Base Station

First Application Example

Figure 15:
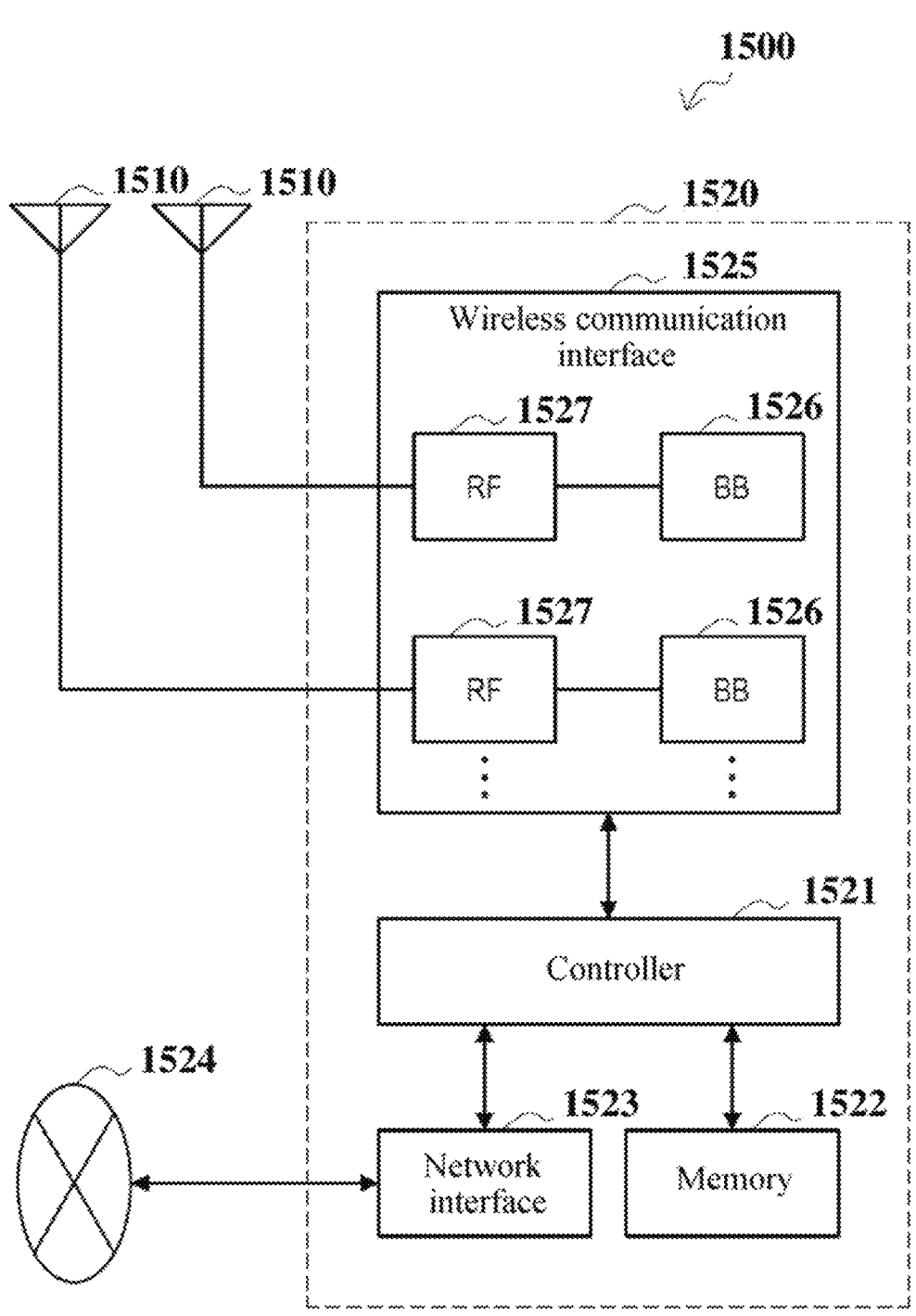
FIG. 15 is a block diagram showing a first schematic configuration example of an evolution Node B (eNB)

FIG. 15 is a block diagram showing a first schematic configuration example of an eNB to which the technology of the present disclosure may be applied. An eNB 1500 includes one or more antennas 1510 and a base station apparatus 1520. The base station apparatus 1520 and each antenna 1510 may be connected to each other via an RF cable.

Each of the antennas 1510 includes a single or multiple antenna elements (such as multiple antenna elements included in a multi-input multi-output (MIMO) antenna), and is used for the base station apparatus 1520 to transmit and receive wireless signals. As shown in FIG. 15, the eNB 1500 may include the multiple antennas 1510. For example, the multiple antennas 1510 may be compatible with multiple frequency bands used by the eNB 1500. Although FIG. 15 shows the example in which the eNB 1500 includes the multiple antennas 1510, the eNB 1500 may also include a single antenna 1510.

The base station apparatus 1520 includes a controller 1521, a memory 1522, a network interface 1523, and a wireless communication interface 1525.

The controller 1521 may be, for example, a CPU or a DSP, and operates various functions of a higher layer of the base station apparatus 1520. For example, the controller 1521 generates a data packet from data in signals processed by the wireless communication interface 1525, and transfers the generated packet via the network interface 1523. The controller 1521 may bundle data from multiple base band processors to generate the bundled packet, and transfer the generated bundled packet. The controller 1521 may have logical functions of performing control such as radio resource control, radio bearer control, mobility management, admission control and scheduling. The control may be performed in corporation with an eNB or a core network node in the vicinity. The memory 1522 includes a RAM and a ROM, and stores a program executed by the controller 1521, and various types of control data (such as a terminal list, transmission power data, and scheduling data).

The network interface 1523 is a communication interface for connecting the base station apparatus 1520 to a core network 1524. The controller 1521 may communicate with a core network node or another eNB via the network interface 1523. In this case, the eNB 1500, and the core network node or the other eNB may be connected to each other via a logical interface (such as an S1 interface and an X2 interface). The network interface 1523 may also be a wired communication interface or a wireless communication interface for wireless backhaul. If the network interface 1523 is a wireless communication interface, the network interface 1823 may use a higher frequency band for wireless communication than a frequency band used by the wireless communication interface 1525.

The wireless communication interface 1525 supports any cellular communication scheme (such as Long Term Evolution (LTE) and LTE-Advanced), and provides wireless connection to a terminal positioned in a cell of the eNB 1500 via the antenna 1510. The wireless communication interface 1525 may typically include, for example, a BB processor 1526 and an RF circuit 1527. The BB processor 1526 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 1526 may have a part or all of the above-described logical functions instead of the controller 1521. The processor 1526 may be a memory that stores a communication control program, or a module that includes a processor and a related circuit configured to execute the program. Updating the program may allow the functions of the BB processor 1526 to be changed. The module may be a card or a blade that is inserted into a slot of the base station apparatus 1520. Alternatively, the module may also be a chip that is mounted on the card or the blade. Meanwhile, the RF circuit 1527 may include, for example, a mixer, a filter, and an amplifier, and transmits and receives wireless signals via the antenna 1510.

As shown in FIG. 15, the wireless communication interface 1525 may include the multiple BB processors 1526. For example, the multiple BB processors 1526 may be compatible with multiple frequency bands used by the eNB 1500. As shown in FIG. 15, the wireless communication interface 1525 may include the multiple RF circuits 1527. For example, the multiple RF circuits 1527 may be compatible with multiple antenna elements. Although FIG. 15 shows the example in which the wireless communication interface 1525 includes the multiple BB processors 1526 and the multiple RF circuits 1527, the wireless communication interface 1525 may also include a single BB processor 1526 or a single RF circuit 1527.

Second Application Example

Figure 16:
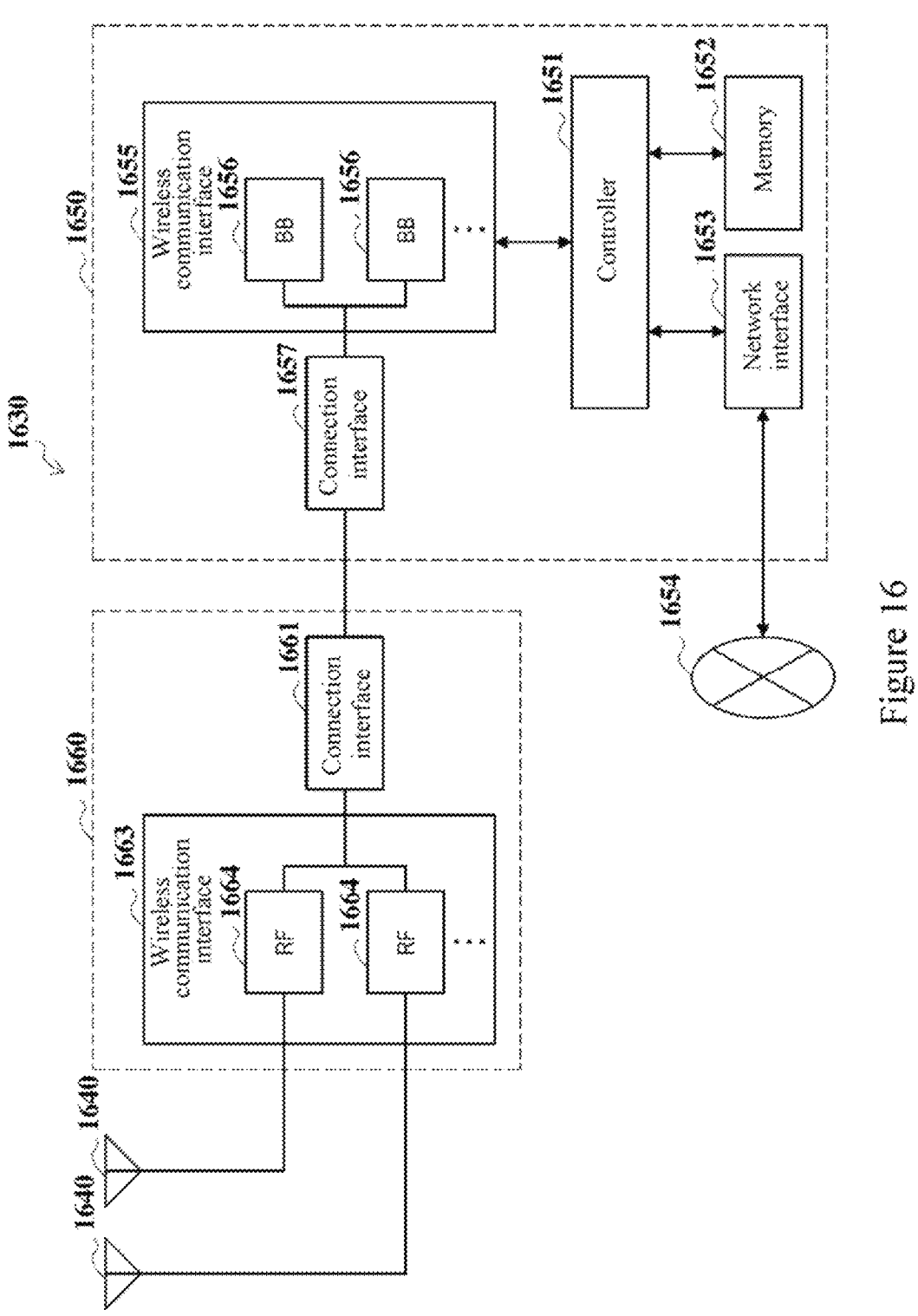
FIG. 16 is a block diagram showing a second schematic configuration example of the eNB.

FIG. 16 is a block diagram showing a second schematic configuration example of the eNB to which the technology of the present disclosure may be applied. An eNB 1630 includes one or more antennas 1640, a base station apparatus 1650, and an RRH 1660. The RRH 1660 and each antenna 1640 may be connected to each other via an RF cable. The base station apparatus 1650 and the RRH 1660 may be connected to each other via a high speed line such as an optical fiber cable.

Each of the antennas 1640 includes a single or multiple antenna elements (such as multiple antenna elements included in an MIMO antenna), and is used for the RRH 1660 to transmit and receive wireless signals. As shown in FIG. 16, the eNB 1630 may include the multiple antennas 1640. For example, the multiple antennas 1640 may be compatible with multiple frequency bands used by the eNB 1930. Although FIG. 16 shows the example in which the eNB 1630 includes the multiple antennas 1640, the eNB 1630 may also include a single antenna 1640.

The base station apparatus 1650 includes a controller 1651, a memory 1652, a network interface 1653, a wireless communication interface 1655, and a connection interface 1657. The controller 1651, the memory 1652, and the network interface 1653 are the same as the controller 1521, the memory 1522, and the network interface 1523 described with reference to FIG. 15.

The wireless communication interface 1655 supports any cellular communication scheme (such as LTE and LTE-Advanced), and provides wireless communication to a terminal positioned in a sector corresponding to the RRH 1660 via the RRH 1660 and the antenna 1640. The wireless communication interface 1655 may typically include, for example, a BB processor 1656. The BB processor 1656 is the same as the BB processor 1526 described with reference to FIG. 15, except that the BB processor 1656 is connected to an RF circuit 1664 of the RRH 1660 via the connection interface 1657. As shown in FIG. 16, the wireless communication interface 1655 may include the multiple BB processors 1656. For example, the multiple BB processors 1656 may be compatible with multiple frequency bands used by the eNB 1630. Although FIG. 16 shows the example in which the wireless communication interface 1655 includes the multiple BB processors 1656, the wireless communication interface 1655 may also include a single BB processor 1656.

The connection interface 1657 is an interface for connecting the base station apparatus 1650 (wireless communication interface 1655) to the RRH 1660. The connection interface 1657 may also be a communication module for performing communication in the above-described high speed line that connects the base station apparatus 1650 (wireless communication interface 1655) to the RRH 1660.

The RRH 1660 includes a connection interface 1661 and a wireless communication interface 1663.

The connection interface 1661 is an interface for connecting the RRH 1660 (wireless communication interface 1663) to the base station apparatus 1650. The connection interface 1661 may also be a communication module for performing communication in the above-described high speed line.

The wireless communication interface 1663 transmits and receives wireless signals via the antenna 1640. The wireless communication interface 1663 may typically include, for example, the RF circuit 1664. The RF circuit 1664 may include, for example, a mixer, a filter, and an amplifier, and transmits and receives wireless signals via the antenna 1640. As shown in FIG. 16, the wireless communication interface 1663 may include multiple RF circuits 1664. For example, the multiple RF circuits 1664 may support multiple antenna elements. Although FIG. 16 shows the example in which the wireless communication interface 1663 includes the multiple RF circuits 1664, the wireless communication interface 1663 may also include a single RF circuit 1664.

In the eNB 1500 and the eNB 1630 respectively shown in FIG. 15 and FIG. 16, the determination unit 210, the configuration unit 220, the generation unit 230, the feedback unit 250, and the setting unit 260 described in FIG. 2 may be implemented by the controller 1521 and/or the controller 1651. At least part of the functions may also be implemented by the controller 1521 and the controller 1651. For example, the controller 1521 and/or the controller 1651 may perform the following functions: determining that multiple user equipments share a COT of one user equipment, configuring frequency domain resources for the user equipment, generating frequency domain resource indication information and time domain resource indication information, generating feedback information, and setting a configured BWP, an activated BWP and parameters of the BWP for the user equipment, by executing instructions stored in the memory.

Application Example on Terminal Device

First Application Example

Figure 17:
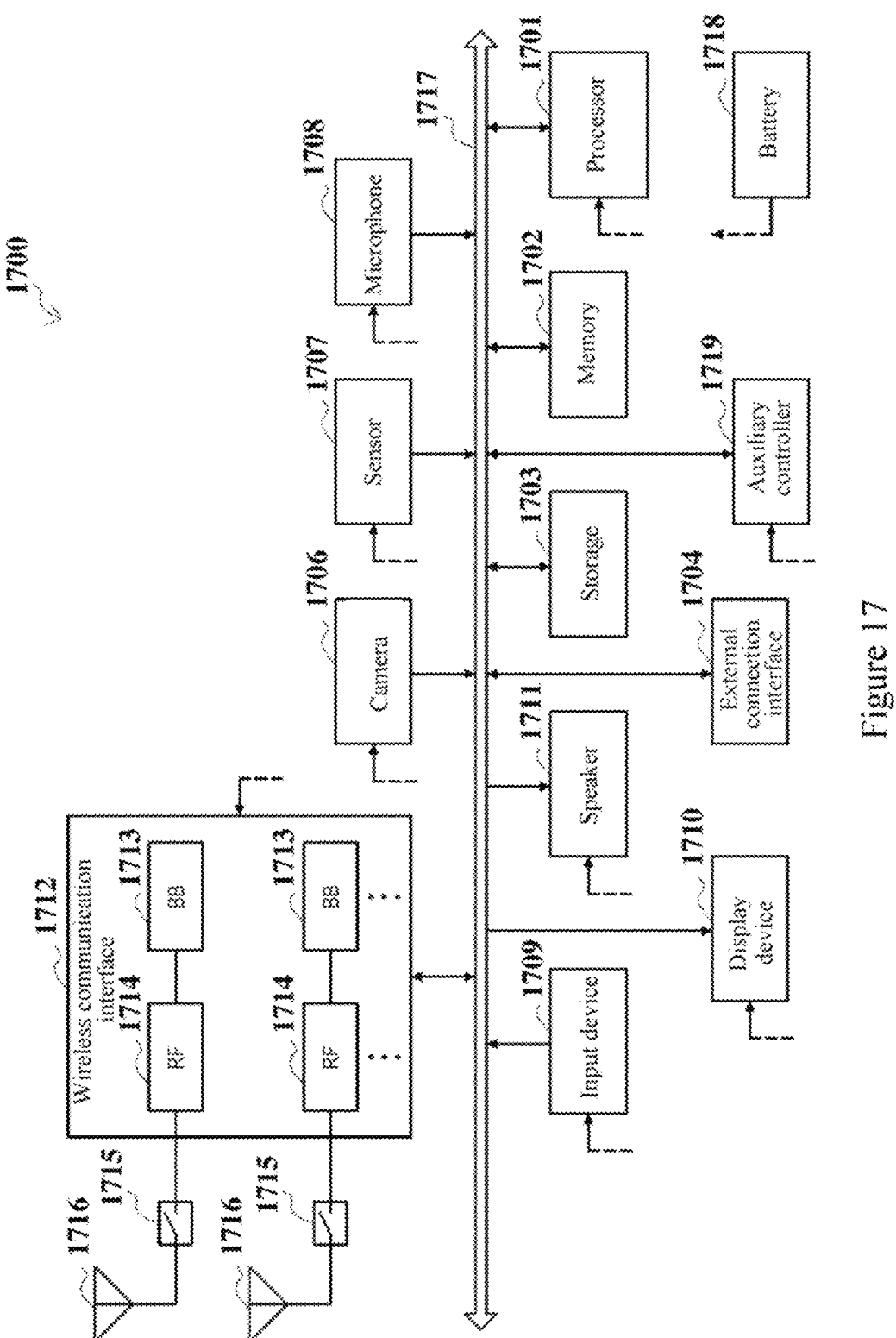
FIG. 17 is a block diagram showing a schematic configuration example of a smart phone.

FIG. 17 is a block diagram showing a schematic configuration example of a smart phone 1700 to which the technology of the present disclosure may be applied. The smart phone 1700 includes a processor 1701, a memory 1702, a storage 1703, an external connection interface 1704, a camera 1706, a sensor 1707, a microphone 1708, an input device 1709, a display device 1710, a speaker 1711, a wireless communication interface 1712, one or more antenna switches 1715, one or more antennas 1716, a bus 1717, a battery 1718, and an auxiliary controller 1719.

The processor 1701 may be, for example, a CPU or a system on a chip (SoC), and controls functions of an application layer and another layer of the smart phone 1700. The memory 1702 includes a RAM and a ROM, and stores a program executed by the processor 1701 and data. The storage 1703 may include a storage medium such as a semiconductor memory and a hard disk. The external connection interface 1704 is an interface for connecting an external apparatus (such as a memory card and a universal serial bus (USB) apparatus) to the smart phone 1700.

The camera 1706 includes an image sensor (such as a charge coupled device (CCD) and a complementary metal oxide semiconductor (CMOS)), and generates a captured image. The sensor 1707 may include a group of sensors such as a measurement sensor, a gyro sensor, a geomagnetic sensor, and an acceleration sensor. The microphone 1708 converts sounds that are inputted to the smart phone 1700 to audio signals. The input device 1709 includes, for example, a touch sensor configured to detect touch onto a screen of the display device 1710, a keypad, a keyboard, a button, or a switch, and receive an operation or information inputted from a user. The display device 1710 includes a screen (such as a liquid crystal display (LCD) and an organic light-emitting diode (OLED) display), and displays an output image of the smart phone 1700. The speaker 1711 converts audio signals that are outputted from the smart phone 1700 to sounds.

The wireless communication interface 1712 supports any cellular communication scheme (such as LTE and LTE-Advanced), and performs wireless communication. The wireless communication interface 1712 may typically include, for example, a BB processor 1713 and an RF circuit 1714. The BB processor 1713 may perform, for example, encoding/decoding, modulating/demodulating, and multiplexing/demultiplexing, and performs various types of signal processing for wireless communication. Meanwhile, the RF circuit 1714 may include, for example, a mixer, a filter, and an amplifier, and transmits and receives wireless signals via the antenna 1716. The wireless communication interface 1712 may be a chip module having the BB processor 1713 and the RF circuit 1714 integrated thereon. As shown in FIG. 17, the wireless communication interface 1712 may include multiple BB processors 1713 and multiple RF circuits 1714. Although FIG. 17 shows the example in which the wireless communication interface 1712 includes the multiple BB processors 1713 and the multiple RF circuits 1714, the wireless communication interface 1712 may also include a single BB processor 1713 or a single RF circuit 1714.

Furthermore, in addition to a cellular communication scheme, the wireless communication interface 1712 may support another type of wireless communication scheme such as a short-distance wireless communication scheme, a near field communication scheme, and a wireless local area network (LAN) scheme. In this case, the wireless communication interface 1712 may include the BB processor 1713 and the RF circuit 1714 for each wireless communication scheme.

Each of the antenna switches 1715 switches connection destinations of the antennas 1716 among multiple circuits (such as circuits for different wireless communication schemes) included in the wireless communication interface 1712.

Each of the antennas 1716 includes a single or multiple antenna elements (such as multiple antenna elements included in an MIMO antenna), and is used for the wireless communication interface 1712 to transmit and receive wireless signals. As shown in FIG. 17, the smart phone 1700 may include the multiple antennas 1716. Although FIG. 17 shows the example in which the smart phone 1700 includes the multiple antennas 1716, the smart phone 1700 may also include a single antenna 1716.

Furthermore, the smart phone 1700 may include the antenna 1716 for each wireless communication scheme. In this case, the antenna switches 1715 may be omitted from the configuration of the smart phone 1700.

The bus 1717 connects the processor 1701, the memory 1702, the storage 1703, the external connection interface 1704, the camera 1706, the sensor 1707, the microphone 1708, the input device 1709, the display device 1710, the speaker 1711, the wireless communication interface 1712, and the auxiliary controller 1719 to each other. The battery 1718 supplies power to blocks of the smart phone 1700 shown in FIG. 17 via feeder lines that are partially shown as dashed lines in the FIG. 17. The auxiliary controller 1719 operates a minimum necessary function of the smart phone 1700, for example, in a sleep mode.

In the smart phone 1700 shown in FIG. 17, the determination 1010, the generation unit 1020, the configuration unit 1040, the detection unit 1050, the uplink information generation unit 1060, the switching unit 1070 and the indication information generation unit 1080 described in FIG. 10 may be implemented by the processor 1701 and the auxiliary controller 1719. At least part of the functions may be implemented by the professor 1701 or the auxiliary controller 1719. For example, the professor 1701 or the auxiliary controller 1719 may perform the following functions: determining that other user equipment shares a COT of the smart phone 1700, generating time domain resource indication information, determining frequency domain resources for transmitting uplink information, performing the channel detection process, generating uplink information, switching a BWP, and generating indicating information indicating channel conditions of a BWP before being switched, by executing instructions stored in the memory 1702 or the storage 1703.

Second Application Example

Figure 18:
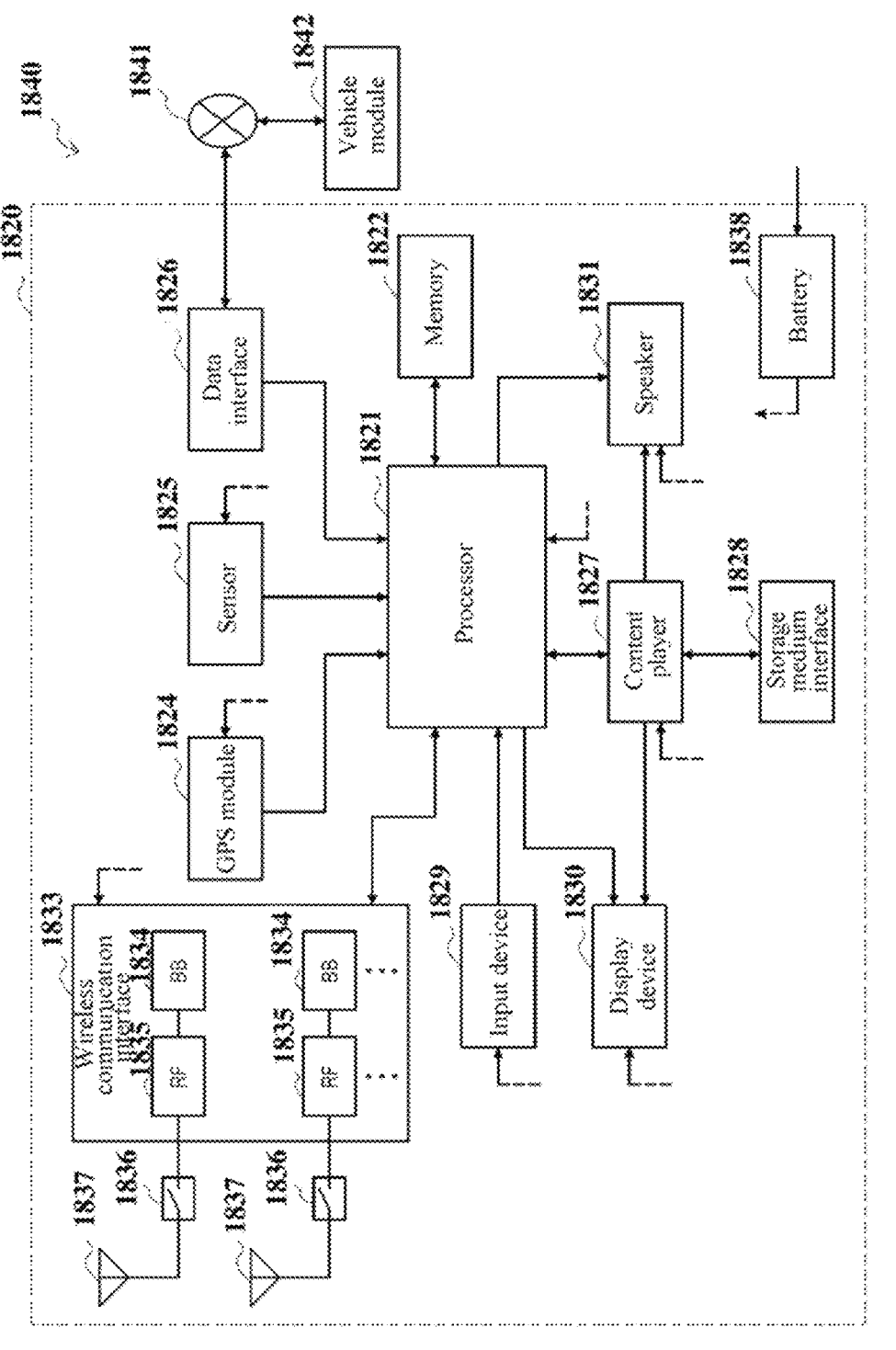
FIG. 18 is a block diagram showing a schematic configuration example of a car navigation apparatus.

FIG. 18 is a block diagram showing a schematic configuration example of a car navigation apparatus 1820 to which the technology of the present disclosure may be applied. The car navigation apparatus 1820 includes a processor 1821, a memory 1822, a global positioning system (GPS) module 1824, a sensor 1825, a data interface 1826, a content player 1827, a storage medium interface 1828, an input device 1829, a display device 1830, a speaker 1831, a wireless communication interface 1833, one or more antenna switches 1836, one or more antennas 1837, and a battery 1838.

The processor 1821 may be, for example, a CPU or a SoC, and controls a navigation function and another function of the car navigation apparatus 1820. The memory 1822 includes a RAM and a ROM, and stores a program executed by the processor 1821 and data.

The GPS module 1824 determines a position (such as latitude, longitude, and altitude) of the car navigation apparatus 1820 by using GPS signals received from a GPS satellite. The sensor 1825 may include a group of sensors such as a gyro sensor, a geomagnetic sensor, and an air pressure sensor. The data interface 1826 is connected to, for example, an in-vehicle network 1841 via a terminal that is not shown, and acquires data (such as vehicle speed data) generated by the vehicle.

The content player 1827 reproduces content stored in a storage medium (such as a CD and a DVD) that is inserted into the storage medium interface 1828. The input device 1829 includes, for example, a touch sensor configured to detect touch onto a screen of the display device 1830, a button or a switch, and receives an operation or information inputted from a user. The display device 1830 includes a screen such as a LCD or an OLED display, and displays an image of the navigation function or content that is reproduced. The speaker 1831 outputs sounds of the navigation function or the content that is reproduced.

The wireless communication interface 1833 supports any cellular communication scheme (such as LTE and LTE-Advanced), and performs wireless communication. The wireless communication interface 1833 may typically include, for example, a BB processor 1834 and an RF circuit 1835. The BB processor 1834 may perform, for example, encoding/decoding, modulating/demodulating, and multiplexing/demultiplexing, and performs various types of signal processing for wireless communication. Meanwhile, the RF circuit 1835 may include, for example, a mixer, a filter, and an amplifier, and transmits and receives wireless signals via the antenna 1837. The wireless communication interface 1833 may also be a chip module having the BB processor 1834 and the RF circuit 1835 integrated thereon. As shown in FIG. 18, the wireless communication interface 1833 may include the multiple BB processors 1834 and the multiple RF circuits 1835. Although FIG. 18 shows the example in which the wireless communication interface 1833 includes the multiple BB processors 1834 and the multiple RF circuits 1835, the wireless communication interface 1833 may also include a single BB processor 1834 or a single RF circuit 1835.

Furthermore, in addition to the cellular communication scheme, the wireless communication interface 1833 may support another type of wireless communication scheme such as a short-distance wireless communication scheme, a near field communication scheme, and a wireless LAN scheme. In this case, the wireless communication interface 1833 may include the BB processor 1834 and the RF circuit 1835 for each wireless communication scheme.

Each of the antenna switches 1836 switches connection destinations of the antennas 1837 among multiple circuits (such as circuits for different wireless communication schemes) included in the wireless communication interface 1833.

Each of the antennas 1837 includes a single or multiple antenna elements (such as multiple antenna elements included in an MIMO antenna), and is used for the wireless communication interface 1833 to transmit and receive wireless signals. As shown in FIG. 18, the car navigation apparatus 1820 may include the multiple antennas 1837. Although FIG. 18 shows the example in which the car navigation apparatus 1820 includes the multiple antennas 1837, the car navigation apparatus 1820 may also include a single antenna 1837.

Furthermore, the car navigation apparatus 1820 may include the antenna 1837 for each wireless communication scheme. In this case, the antenna switches 1836 may be omitted from the configuration of the car navigation apparatus 1820.

The battery 1838 supplies power to blocks of the car navigation apparatus 1820 shown in FIG. 18 via feeder lines that are partially shown as dashed lines in the FIG. 18. The battery 1838 accumulates power supplied from the vehicle.

In the car navigation apparatus 1820 shown in FIG. 18, the determination unit 1010, the generation unit 1020, the configuration unit 1040, the detection unit 1050, the uplink information generation unit 1060, the switching unit 1070, and the instruction information generation unit 1080 described in FIG. 10 may be implemented by the processor 1821. At least part of the functions may be implemented by the processor 1821. For example, the processor 1821 may perform the following functions: determining that other user equipment shares a COT of the car navigation apparatus 1820, generating time domain resource indication information, determining frequency domain resource for transmitting uplink information, performing the channel detection process, generating uplink information, switching a BWP, and generating indication information indicating channel conditions of a BWP before being switched by executing the instructions stored in the memory 1822.

The technology of the present disclosure may also be implemented as an in-vehicle system (or a vehicle) 1840 including one or more blocks of the car navigation apparatus 1820, the in-vehicle network 1841 and a vehicle module 1842. The vehicle module 1842 generates vehicle data (such as a vehicle speed, an engine speed or failure information), and outputs the generated data to the in-vehicle network 1841.

The preferred embodiments of the present disclosure are described above with reference to the drawings. The present disclosure is not limited to the above embodiments. Those skilled in the art may make various changes and modifications within the scope of the appended claims. It should be understood that such changes and modifications should fall within the technical scope of the present disclosure.

For example, in the functional block diagrams shown in the drawings, a unit shown in dotted lines indicates that the functional unit is optional in the device, and optional functional units may be combined in an appropriate way to implement a required function.

For example, in the above embodiments, multiple functions in one unit may be implemented by independent devices. Alternatively, in the above embodiments, multiple functions in multiple units may be respectively implemented by independent devices. In addition, one of the above functions may be implemented by multiple units. Needless to say, such configuration is within the technical scope of the present disclosure.

In the present disclosure, steps described in the flow charts are not limited to be performed in a chronological order, but may also be performed in parallel or independently rather than necessarily being in the time order. In addition, in a case that the steps are performed in the chronological order, needless to say, the order may also be changed appropriately.

Although the embodiments of the present disclosure are described above in conjunction with the drawings, it should be understood that the embodiments are only used to illustrate the present disclosure rather than limit the present disclosure. For those skilled in the art, various changes and modifications may be made for the embodiments without departing from the essence and scope of the present disclosure. Therefore, the scope of the present disclosure is defined only by appended claims and equivalent meaning thereof.

The invention claimed is:

1. An electronic device for a user side, comprising processing circuitry configured to:

determine that a Channel Occupy Time (COT) of the electronic device is shared with other user equipment in time domain, wherein the other user equipment and the electronic device transmit information associated with sidelink communication performed between the electronic device and the other user equipment within the COT of the electronic device using orthogonal frequency domain resources; and generate frequency domain resource indication information of the other user equipment, to indicate frequency domain resources used for the other user equipment, wherein the electronic device and the other user equipment transmit the information associated with the sidelink communication performed between the electronic device and the other user equipment using orthogonal frequency domain resources within a same BandWidth Part (BWP), wherein the frequency domain resource indication information of the electronic device indicates an index used for frequency domain resources of the electronic device, the indexes of the frequency domain resources have a mapping relationship with frequency domain resources within the BWP.

2. The electronic device according to claim 1, wherein the processing circuitry is further configured to:

transmit the time domain resource indication information of the other user equipment, to the other user equipment or the network side device.

3. The electronic device according to claim 1, wherein the processing circuitry is further configured to:

receive frequency domain resource indication information of the electronic device from the network side device; and determine frequency domain resources used when the electronic device transmits the uplink information according to the frequency domain resource indication information.

4. The electronic device according to claim 1, wherein the processing circuitry is further configured to:

transmit frequency domain resources used when the electronic device transmits the uplink information to the other user equipment, to cause the other user equipment to transmit the uplink information by selecting frequency domain resources orthogonal to the frequency domain resources used for the electronic device.

5. The electronic device according to claim 1, wherein the electronic device and the other user equipment transmit uplink information to the network side device using different BandWidth Parts BWPs.

6. The electronic device according to claim 5, wherein the processing circuitry is further configured to:

perform a channel detection process on a plurality of BWPs; and transmit uplink information to the network side device using a BWP that is detected to be idle in the channel detection process.

7. The electronic device according to claim 6, wherein the processing circuitry is further configured to:

transmit channel detection results of the plurality of BWPs to the network side device, to cause the network side device to determine at least one of the BWPs that are detected to be idle by the electronic device, as a BWP used for the other user equipment.

8. The electronic device according to claim 6, wherein the processing circuitry is further configured to:

transmit a BWP that is detected to be idle in the channel detection process and is not used by the electronic device to the other user equipment, for the other user equipment to transmit uplink information.

9. The electronic device according to claim 5, wherein the processing circuitry is further configured to:

transmit uplink information to the network side device; and receive feedback information from the network side device using each of a plurality of BWPs of the electronic device that are in the activated state.

10. The electronic device according to claim 5, wherein the processing circuitry is further configured to:

transmit uplink information to the network side device; and switch the electronic device to one of a plurality of BWPs that are in the activated state configured for the electronic device, in a case that no feedback information is received from the network side device within a predetermined time.

11. The electronic device according to claim 10, wherein the processing circuitry is further configured to:

perform a channel detection process on the plurality of BWPs that are in the activated state configured for the electronic device; and switch the electronic device to a BWP that is detected to be idle in the channel detection process among the plurality of BWPs that are in the activated state.

12. The electronic device according to claim 10, wherein the processing circuitry is further configured to:

transmit uplink information to the network side device using a BWP after being switched; and transmit indication information indicating channel conditions of a BWP before being switched to the network side device.

13. An electronic device for a user side, comprising processing circuitry configured to:

receive information associated with a Channel Occupy Time (COT) of the electronic device sharing with other user equipment in time domain, wherein the other user equipment and the electronic device transmit information associated with sidelink communication performed between the electronic device and the other user equipment within the COT of the electronic device using orthogonal frequency domain resources; and receive frequency domain resource indication information of the electronic device, to indicate frequency domain resources used for the electronic device, wherein the electronic device and the other user equipment transmit information associated with sidelink communication performed between the electronic device and the other user equipment using orthogonal frequency domain resources within a same BandWidth Part (BWP), wherein the frequency domain resource indication information of the electronic device indicates an index used for frequency domain resources of the electronic device, the indexes of the frequency domain resources have a mapping relationship with frequency domain resources within the BWP.

* * * * *